United States Patent
Ohta et al.

(10) Patent No.: US 9,011,243 B2
(45) Date of Patent: *Apr. 21, 2015

(54) GAME SYSTEM, GAME DEVICE, STORAGE MEDIUM STORING GAME PROGRAM, AND GAME PROCESS METHOD

(75) Inventors: Keizo Ohta, Kyoto (JP); Kazuhiro Musa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 166 days.

This patent is subject to a terminal disclaimer.

(21) Appl. No.: 13/269,714

(22) Filed: Oct. 10, 2011

(65) Prior Publication Data

US 2012/0115595 A1    May 10, 2012

(30) Foreign Application Priority Data

Nov. 9, 2010   (JP) ................................. 2010-250756

(51) Int. Cl.
   *A63F 13/00*   (2014.01)
   *A63F 13/40*   (2014.01)
   *A63F 13/20*   (2014.01)

(52) U.S. Cl.
   CPC ................. *A63F 13/10* (2013.01); *A63F 13/06* (2013.01); *A63F 2300/105* (2013.01)

(58) Field of Classification Search
   USPC .......................................... 463/30, 31, 32, 46
   See application file for complete search history.

(56) References Cited

U.S. PATENT DOCUMENTS

2002/0097229 A1* 7/2002 Rose et al. .................... 345/173
2002/0165028 A1* 11/2002 Miyamoto et al. .............. 463/46
2003/0078086 A1   4/2003 Matsuyama et al.
2006/0094490 A1*  5/2006 Reeves ............................ 463/16
2009/0280898 A1* 11/2009 Izumi ............................. 463/30
2010/0245232 A1*  9/2010 Birnbaum et al. ............ 345/156
2010/0248824 A1*  9/2010 Suzuki et al. ................... 463/30

FOREIGN PATENT DOCUMENTS

| JP | 2003-126548 | 5/2003 |
| JP | 2006-129942 | 5/2006 |
| JP | 2009-536058 | 10/2009 |
| JP | 2010-233681 | 10/2010 |
| JP | 2010-246612 | 11/2010 |
| WO | WO 2007/128949 | 11/2007 |

OTHER PUBLICATIONS

Office Action issued for U.S. Appl. No. 13/269,735, dated Nov. 29, 2012.

* cited by examiner

*Primary Examiner* — Dmitry Suhol
*Assistant Examiner* — Brandon Gray
(74) *Attorney, Agent, or Firm* — Nixon & Vanderhye, P.C.

(57) ABSTRACT

An example game system includes a game device, a controller device, and a portable display device. The game device calculates an attitude of the controller device, and controls an attitude of a club in a virtual game space based on the attitude of the controller device. An image of the game space including the club is displayed on a predetermined display device separate from the portable display device. An image representing a ball placed in the game space is displayed on the portable display device. Moreover, an image representing a tip of the club is displayed on the portable display device, together with the image representing the ball, when a predetermined axis of the controller device extends toward the portable display device.

20 Claims, 17 Drawing Sheets

GAME SYSTEM, GAME DEVICE, STORAGE MEDIUM STORING GAME PROGRAM, AND GAME PROCESS METHOD

CROSS REFERENCE TO RELATED APPLICATIONS

The disclosure of Japanese Patent Application No. 2010-250756 filed on Nov. 9, 2010, is incorporated herein by reference.

FIELD

The present specification discloses a game system, a game device, a game program, and a game process method, in which a player plays a game by operations of moving a controller device itself.

BACKGROUND AND SUMMARY

There are conventional game systems in which a player can play a game with more realistic gameplay by game operations of moving a controller device itself. For example, there are game systems which have a player character execute a golf swing action in a virtual game space in response to an operation of swinging a controller device as if it was a golf club.

In such a game system, a game image is displayed on a display device (television) provided in front of a player. This game image is an image showing a player character in a so-called "objective perspective", and while it is easy to grasp the position of the player character and the position and the attitude of the golf club, the image is less realistic. Thus, although such a game system allows the player to perform a game operation by an operation similar to a swing action of actually swinging a golf club, there is room for improvement in terms of providing a realistic game that feels as if the player was playing actual golf.

Therefore, in example embodiments, the present specification discloses a game system, a game device, a game program and a game process method with which it is possible to provide a more realistic game in which game operations are performed by moving a controller device.

(1)

An example game system described in the present specification includes a game device, a controller device, and a portable display device.

The controller device includes an attitude data output section and an operation data output section. The attitude data output section outputs attitude data based on an attitude of the controller device. The operation data output section transmits operation data including the attitude data to the game device.

The game device includes a first receiving section, a game process section, a first image output section, and a second image output section. The first receiving section receives the operation data from the controller device. The game process section performs a game control process based on the operation data to generate a first game image and a second game image based on a result of performing the game control process. The first image output section outputs the first game image to a predetermined display device separate from the portable display device. The second image output section outputs the second game image to the portable display device.

The portable display device includes a second receiving section and a display section. The second receiving section receives the second game image from the game device. The display section displays the second game image.

The game process section includes an attitude calculation section, an object control section, a first image generation section, and a second image generation section. The attitude calculation section calculates an attitude of the controller device based on the operation data. The object control section moves a first object placed in a virtual game space based on the attitude of the controller device. The first image generation section generates the first game image by setting a first virtual camera so that the first object is included in a viewing field range. The second image generation section generates a second game image including an image representing at least a part of the first object when a predetermined axis of the controller device lies within a predetermined range including such a direction that the predetermined axis extends toward the portable display device.

The "game device" may be any information processing device capable of performing game processes to generate an image based on the game processes. The game device may be a single-purpose information processing device for games, or a general-purpose information processing device such as an ordinary personal computer.

The "controller device" may further include other components such as a controller described in the embodiment to be described below, in addition to the components described above. For example, the controller device may further include a display mechanism and a sound output mechanism.

The term "portable" means that the device has such a size that it can be held and moved by the user, and the position thereof can be changed to another position by the user. The "portable display device" may be fixed (not moved) during a game as in the embodiment to be described below, or may be moved around during a game.

The "game system" may only include a game device, a controller device, and a portable display device, and may or may not include the predetermined display device for displaying the first game image. That is, the game system may be provided in a form that does not include the display device.

The "attitude data" is a concept that includes data representing the attitude of the controller device and changes of the attitude. The "attitude data" may be any data as long as the game process section can calculate (estimate) the attitude of the controller device based on the attitude data.

As long as the "predetermined display device" is separate from the portable display device, it may be any display device capable of displaying the first game image generated by the game device, as well as than the television 2 illustrated in the embodiment to be described below. For example, the "predetermined display device" may be a display device formed integral (in a single housing) with the game device.

The "image representing at least a part of the first object" may be generated by any method, and it may be obtained by generating an image of the first object as seen from a virtual camera set in the game space or may be provided in advance in the game device or the game program.

The phrase "when a predetermined axis of the controller device lies within a predetermined range including such a direction that the predetermined axis extends toward the portable display device" means a state where the predetermined axis of the controller device extends toward the portable display device or the vicinity thereof. For example, in a case in which the controller device includes an image-capturing device, the game device may determine that "the predetermined axis of the controller device lies within a predetermined range including such a direction that the predetermined axis extends toward the portable display device" if the image-capturing device is capturing an image of the portable display device (if the portable display device is included in the image-capturing range of the image-capturing device).

With the configuration (1) above, the player can move the first object in the game space by a game operation of changing the attitude of the controller device. The image representing at least a part of the first object is displayed on the portable display device when a predetermined axis of the controller device is directed toward the portable display device. Therefore, by looking at the game image displayed on the portable display device, the player can feel as if the player was moving the first object by moving the controller device, thus allowing for a more realistic operation.

The image of the first object on the portable display device is displayed only when the controller device is in a particular attitude. Therefore, it may be difficult for the player to grasp the position/attitude of the first object in the game space solely from the second game image displayed on the portable display device. In contrast, with the configuration (1) above, since the first game image including the first object is displayed on the predetermined display device, the player can easily grasp the position and the attitude of the first object. Thus, with the configuration (1) above, it is possible to provide realistic operations for the player, and it is possible to present, to the player, game images with which the player can easily perform the operations.

(2)

The second image generation section may generate a second game image including an image representing a second object placed in the game space. Then, the object control section moves the second object on at least a condition that the first object and the second object have come into contact with each other.

The "image representing the second object" may be generated by any method, and it may be obtained by generating an image of the second object as seen from a virtual camera set in the game space or may be provided in advance in the game device or the game program.

The "second image generation section" may use at least the condition that the first object and the second object have come into contact with each other, as the condition for moving the second object, and may set an additional condition. For example, the additional condition may be the velocity of the first object be greater than or equal to a predetermined velocity, a predetermined operation be performed on a predetermined button of the controller device, etc.

With the configuration (2) above, the player can move the second object by moving the controller device to control the first object so that the first object hits the second object. That is, with the configuration (2) above, the game operation of hitting the second object by moving the controller device can be made more realistic.

(3)

The object control section may control the first object so that the first object contacts the second object in the game space when a predetermined axis of the controller device is directed toward an image representing the second object displayed on the portable display device.

The phrase "when a predetermined axis of the controller device is directed toward an image representing the second object displayed on the portable display device" means, ideally, a state where the straight line obtained by extending the predetermined axis crosses the image representing the second object. However, the configuration (3) above does not mean that the first object contacts the second object only when the straight line obtained by extending the predetermined axis crosses the image representing the second object. That is, the object control section may bring the first object into contact with the second object also when the predetermined axis points at a position in the vicinity of the image representing the second object. In a case where the process of adjusting the attitude of the first object is performed for the purpose of making the game operation easier, as in the embodiment to be described below, the first object may be brought into contact with the second object even when the predetermined axis is not pointing at the image representing the second object.

With the configuration (3) above, the first object contacts the second object in the game space when the predetermined axis of the controller device is directed toward the image representing the second object. In this case, the image of the first object and the image of the second object are both displayed on the portable display device. Therefore, the player can hit the second object with the first object in the virtual space by directing the controller device toward the image of the second object in the real space. The operation of hitting the second object with the first object controlled by the player can be made more realistic.

(4)

The object control section may calculate a moving velocity of the second object based on a velocity of the controller device when the first object and the second object come into contact with each other.

The "velocity of the controller device" may be the moving velocity or the angular velocity of the controller device.

With the configuration (4) above, the second object moves with a velocity based on the velocity of the controller device when the first object and the second object come into contact with each other. Therefore, the player can move the second object by an operation of swinging the controller device, and since the moving velocity of the second object can be changed based on how fast the controller device is swung, the operation of moving the second object can be made more realistic.

(5)

The object control section may calculate a moving direction of the second object based on an attitude of the controller device for rotation about a predetermined axis when the first object and the second object come into contact with each other.

With the configuration (5) above, the moving direction of the second object changes based on the direction of the controller device when the first object and the second object come into contact with each other. Therefore, the player can move the second object by an operation of swinging the controller device and can also change the moving direction of the second object depending on the direction of the controller device when it is swung, and therefore the operation of moving the second object can be made more realistic.

(6)

The attitude data output section may output attitude data including captured image data of a captured image captured by an image-capturing device provided in the controller device. Then, the object control section calculates the attitude of the controller device based on a position, in the captured image, of a predetermined image-capturing object provided on the portable display device, and controls the first object based on the attitude of the controller device.

The "captured image data" may be the image data itself of the captured image or may be data representing information obtained from the captured image (e.g., information indicating the position of a predetermined image-capturing object in the captured image such as the marker coordinates in the embodiment to be described below).

With the configuration (6) above, the attitude of the controller device is calculated based on the position of the image-capturing object in the captured image. Therefore, it is possible to accurately calculate the attitude of the controller device, and it is therefore possible to accurately control the action of the first object using the controller device.

(7)

The object control section may calculate the attitude of the controller device based on the captured image data so that a predetermined axis of the controller device lies within a predetermined range including such a direction that the predetermined axis extends toward the portable display device when the image-capturing device is capturing an image of the image-capturing object.

With the configuration (7) above, it is possible to accurately determine whether the image-capturing direction of the controller device is directed toward the portable display device, irrespective of the positional relationship between the controller device and the portable display device. Therefore, the configuration (7) above is particularly advantageous in a case in which a predetermined process is performed depending on the positional relationship between the controller device and the portable display device, as with the configuration (1) above.

(8)

The attitude data output section may include a sensor whose detection result varies based on the attitude of the controller device, and output attitude data which further includes output data of the sensor. Then, the object control section calculates the attitude of the controller device based on the output data of the sensor, and adjusts the calculated attitude based on the captured image data when the image-capturing device is capturing an image of the image-capturing object.

With the configuration (8) above, it is possible to more accurately calculate the attitude of the controller device by calculating the attitude of the controller device by further using the output of the sensor whose detection result varies based on the attitude.

(9)

The attitude data output section may include an acceleration sensor and a gyrosensor as the sensor. Then, the attitude data includes acceleration data detected by the acceleration sensor and angular velocity data detected by the gyrosensor. The object control section adjusts, using the acceleration data and the captured image data, the attitude of the controller device calculated based on the angular velocity data.

With the configuration (9) above, it is possible to more accurately calculate the attitude of the controller device using the detection result of the acceleration sensor and the gyrosensor.

(10)

The second image generation section may place a second virtual camera in the game space to generate, as the second game image, an image representing the game space as seen from the second virtual camera.

With the configuration (10) above, since the second game image is generated using the second virtual camera placed in the game space, the game device can generate the second game image without providing image data in advance.

(11)

The second image generation section may generate the second game image using image data representing an object stored in a memory accessible from the game device.

With the configuration (11) above, the second image generation section may use image data stored in the memory for at least some of the plurality of objects to be displayed as the second game image, whereas images may be generated using the virtual camera for the other objects. That is, the second image generation section may generate the game image by combining images provided in advance with images generated using the virtual camera.

With the configuration (11) above, since the second game image is generated using image data provided in advance, it is possible to generate more realistic game images by simple processes.

(12)

The second image generation section generate the second game image so that an image representing at least a part of the first object is displayed at a position based on the attitude of the controller device.

With the configuration (12) above, the display position of the image representing at least a part of the first object changes based on the attitude of the controller device. Thus, the operation of controlling the action of the first object using the controller device can be made more realistic.

(13)

The second image generation section may generate the second game image so that an image representing at least a part of the first object is displayed in a direction based on the attitude of the controller device for rotation about the predetermined axis.

With the configuration (13) above, the display direction of the image representing at least a part of the first object changes based on the direction of the controller device. Thus, the operation of controlling the action of the first object using the controller device can be made more realistic.

(14)

Another example game system described in the present specification includes a game device, a controller device, and a portable display device. The game system includes an operation data obtaining section, an attitude calculation section, an object control section, a first image generation section, and a second image generation section. The operation data obtaining section obtains operation data including attitude data based on an attitude of the controller device. The attitude calculation section calculates the attitude of the controller device based on the operation data. The object control section moves a predetermined object placed in a virtual game space based on the attitude of the controller device. The first image generation section generates, as a game image to be displayed on a predetermined display device separate from the portable display device, the first game image by setting a first virtual camera so that the predetermined object is included in a viewing field range. The second image generation section generates, as a game image to be displayed on the portable display device, a second game image including an image representing at least a part of the first object when a predetermined axis of the controller device lies within a predetermined range including such a direction that the predetermined axis extends toward the portable display device.

With the configuration (14) above, as with the configuration (1) above, the first object in the game space is moved by a game operation of changing the attitude of the controller device, and the image representing at least a part of the first object is displayed on the portable display device when a predetermined axis of the controller device is directed toward the portable display device. Therefore, the player can feel as if the player was moving the first object by moving the controller device, thus allowing for a more realistic operation. As with the configuration (1) above, since the first game image including the first object is displayed on the predetermined display device, the player can easily grasp the position and the attitude of the first object. Thus, with the configuration (14) above, it is possible to provide realistic operations for the player, and it is possible to present, to the player, game images with which the player can easily perform the operations.

(15)

Another example game system described in the present specification includes a game device, a controller device, and a portable display device. The game system includes an object control section, a first display control section, and a second display control section. The object control section calculates an attitude of the controller device, and control an attitude of a club in a virtual game space based on the attitude of the controller device. The first display control section displays an image of the game space including the club on a predetermined display device separate from the portable display device. The second display control section displays an image representing a ball placed in the game space on the portable display device, and displaying, on the portable display device, an image representing a tip of the club, together with the image representing the ball, when a predetermined axis of the controller device extends toward the portable display device.

With the configuration (15) above, the operation of moving the club in the virtual game space by moving the controller device can be made more realistic by placing the portable display device at an appropriate position (e.g., on the floor surface in front of the player).

(16)

An example game device described in the present specification is a game device capable of capable of communicating with a controller device and a portable display device. The game device includes a receiving section, a game process section, a first image output section, and a second image output section. The receiving section receives, from the controller device, operation data including attitude data based on an attitude of the controller device. The game process section performs a game control process based on the operation data to generate a first game image and a second game image based on a result of performing the game control process. The first image output section outputs the first game image to a predetermined display device separate from the portable display device. The second image output section outputs the second game image to the portable display device so as to display the second game image on the portable display device.

The game process section includes an attitude calculation section, an object control section, a first image generation section, and a second image generation section. The attitude calculation section calculates an attitude of the controller device based on the operation data. The object control section moves a first object placed in a virtual game space based on the attitude of the controller device. The first image generation section generates the first game image by setting a first virtual camera so that the first object is included in a viewing field range. The second image generation section generates a second game image including an image representing at least a part of the first object when a predetermined axis of the controller device lies within a predetermined range including such a direction that the predetermined axis extends toward the portable display device.

With the configuration (16) above, as with the configuration (1) above, it is possible to provide a realistic operation to the player and to present to the player a game image which makes it easier to perform the operation.

The present specification also discloses a computer-readable storage medium storing a game program which instructs a computer of a game device to function as various mechanisms equivalent to various sections of the game device in the configurations (1) to (16) above. The present specification also discloses a game process method to be executed in the game system of the configurations (1) to (15) above.

With the game system, the game device, the storage medium storing a game program, and the game process method described above, the first object in the game space is moved by a game operation of changing the attitude of the controller device, and the image representing at least a part of the first object is displayed on the portable display device when a predetermined axis of the controller device is directed toward the portable display device. Therefore, the player can feel as if the player was moving the first object by moving the controller device, thus allowing for a more realistic operation.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. General Configuration of Game System]

Figure 1:
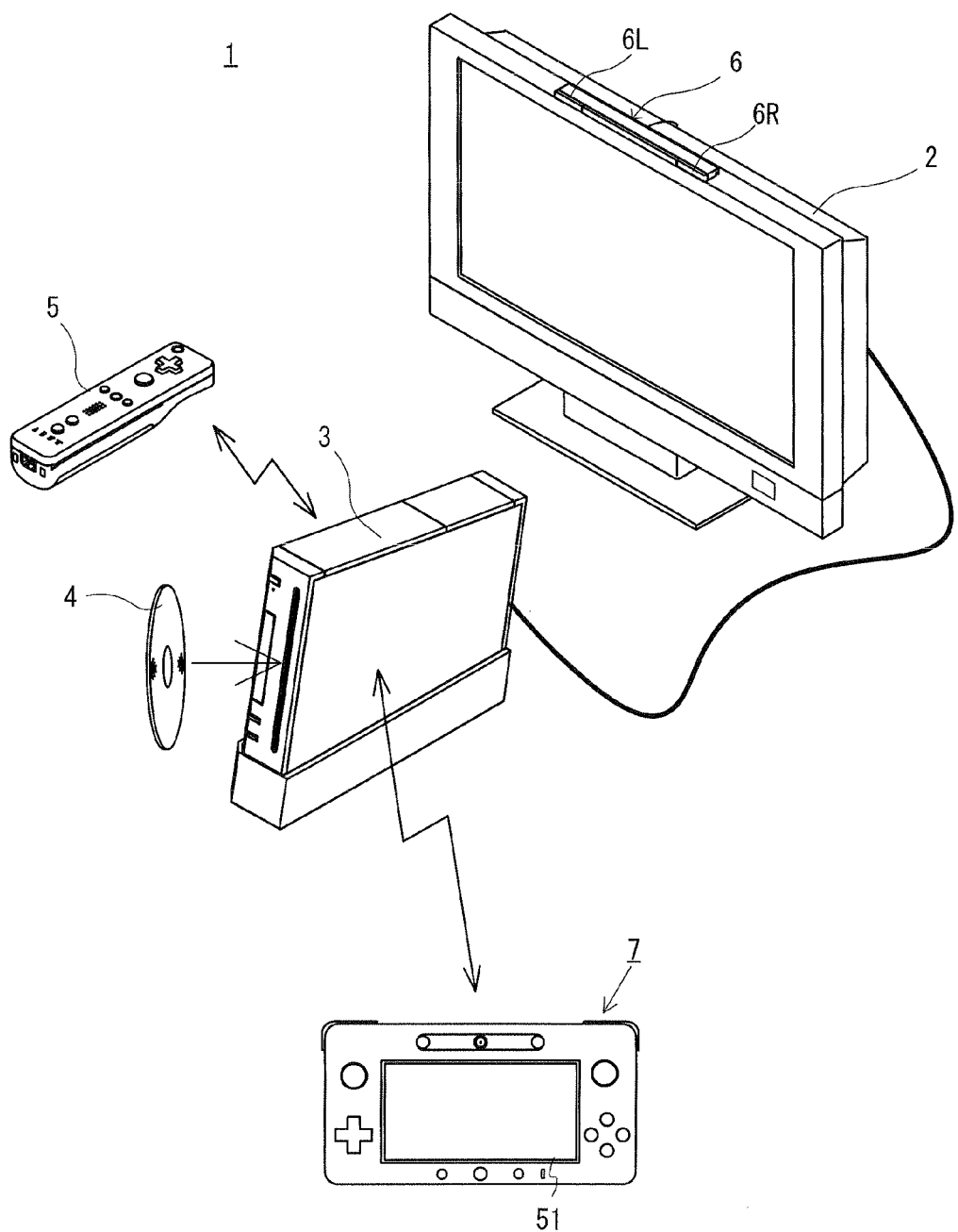
FIG. 1 is an external view of an example non-limiting game system.

A game system 1 of the present embodiment will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs game processes based on game operations performed using the controller 5, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3, and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, the controller 5 and the game device 3 may be connected by a wired connection. While only one controller 5 is included in the game system 1 in the present embodiment, the game device 3 can communicate with a plurality of controllers, and a game can be played by multiple players by using a predetermined number of controllers at the same time. The detailed configuration of the controller 5 will be described below.

The terminal device 7 is sized so that it can be held by the user, and the user can hold and move the terminal device 7, or can use a terminal device 7 placed at an arbitrary position. The terminal device 7, whose detailed configuration will be described below, includes an LCD (Liquid Crystal Display) 51 as a display, input mechanisms (e.g., a touch panel 52, a gyrosensor 64, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, the terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
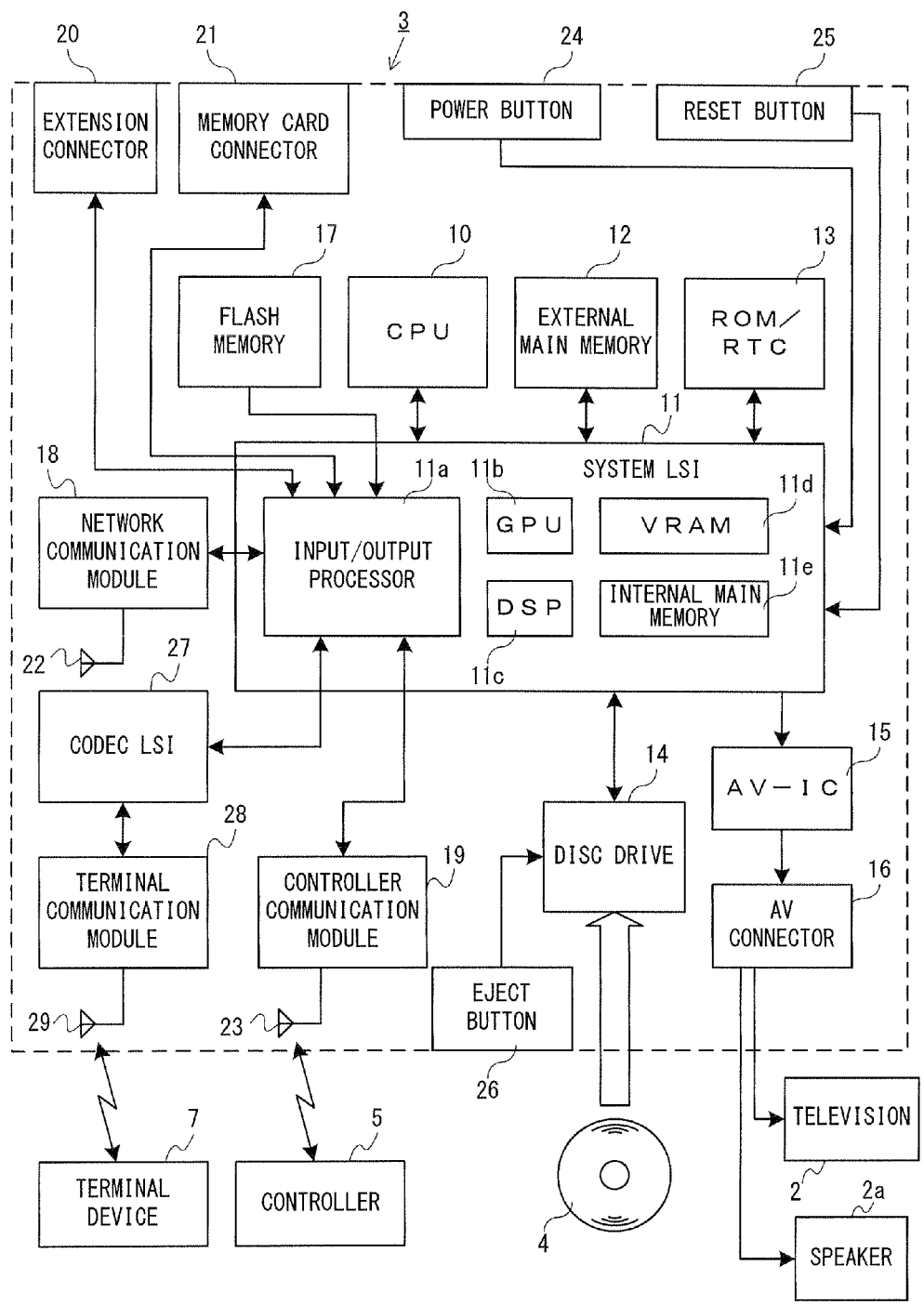
FIG. 2 is a block diagram showing an internal configuration of an example non-limiting game device.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) necessary for the GPU 11b to execute the graphics commands. When images are generated, the GPU 11b generates image data using data stored in the VRAM 11d. In the present embodiment, the game device 3 generates both game images displayed on the television 2 and game images displayed on the terminal device 7. Hereinafter, the game images displayed on the television 2 may be referred to as the "television game images", and the game images displayed on the terminal device 7 may be referred to as the "terminal game images".

The DSP 11c, functioning as an audio processor, generates sound data using sound data and sound waveform (e.g., tone quality) data stored in one or both of the internal main memory 11e and the external main memory 12. In the present embodiment, as with the game images, game sounds to be outputted from the speaker of the television 2 and game sounds to be outputted from the speaker of the terminal device 7 are both generated. Hereinafter, the game sounds outputted from the television 2 may be referred to as "television game sounds", and the game sounds outputted from the terminal device 7 may be referred to as "terminal game sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a is connected to a network such as the Internet via the network communication module 18 and the antenna 22 and can communicate with external information processing device(s) connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it may be a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker section (a marker section 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
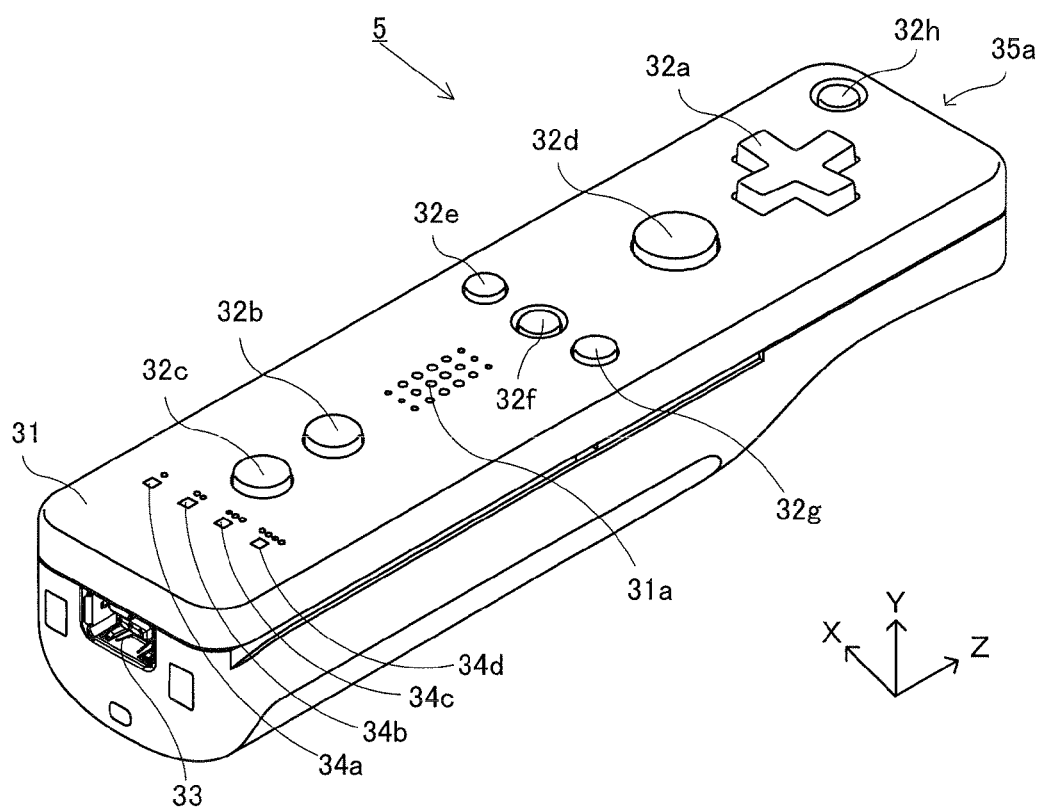
FIG. 3 is a perspective view showing an external configuration of an example non-limiting controller.
Figure 4:
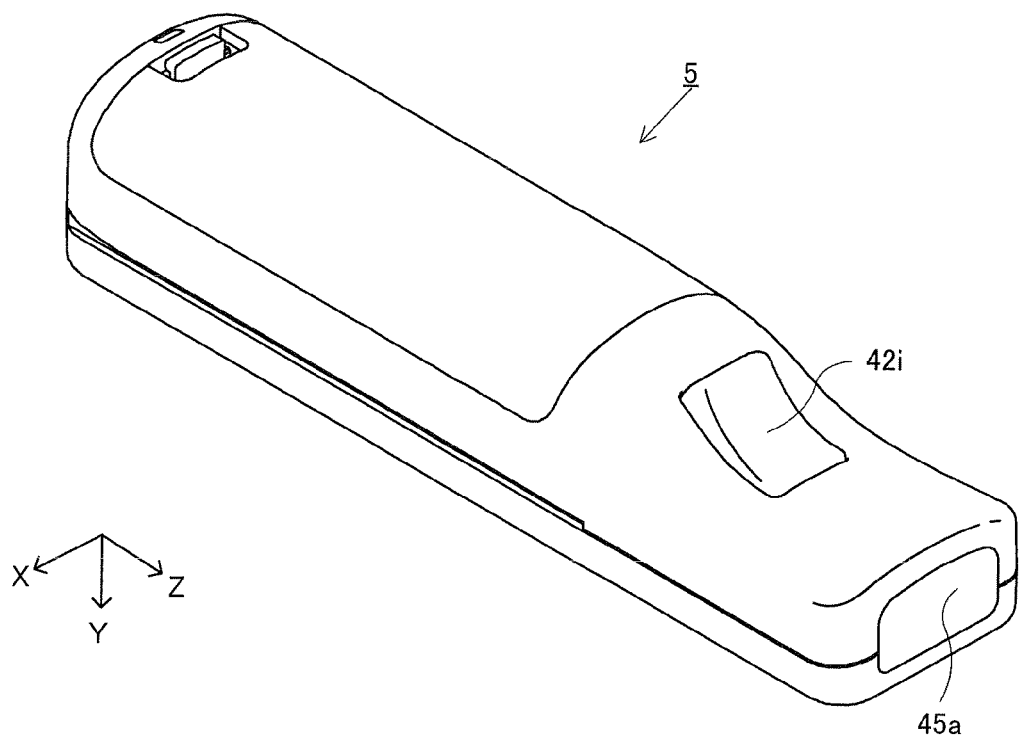
FIG. 4 is a perspective view showing an external configuration of an example non-limiting controller.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing section 35 (FIG. 6), and a light incident surface 35a of an image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
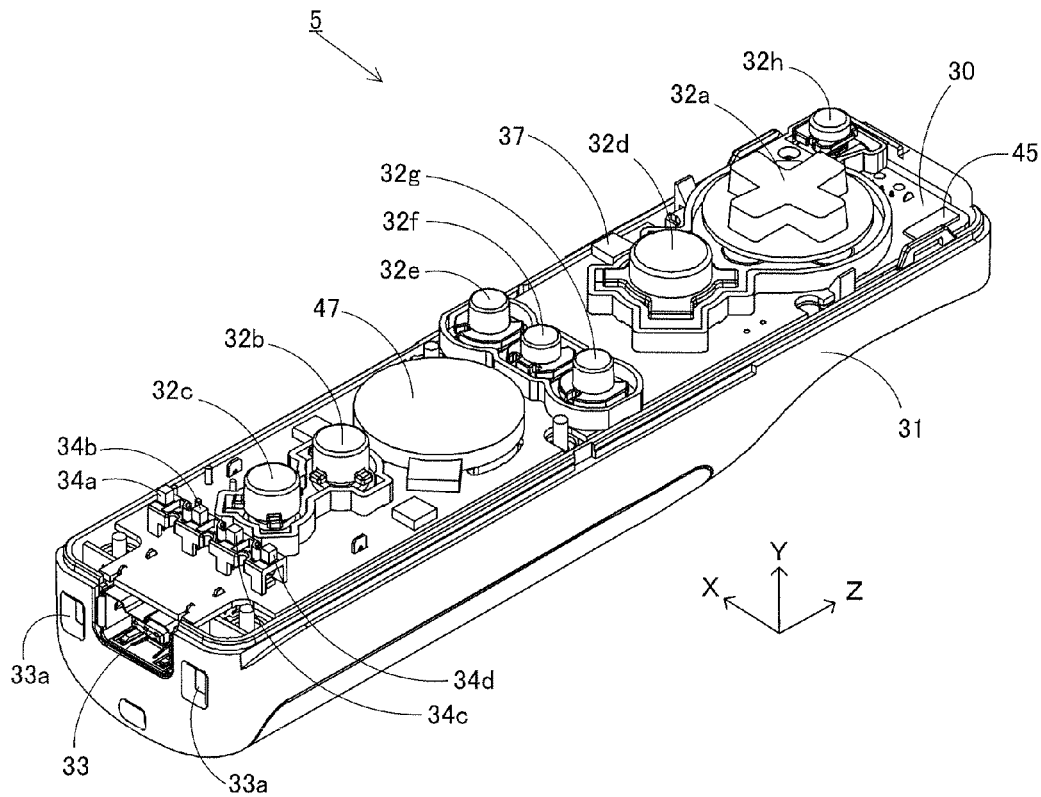
FIG. 5 is a diagram showing an internal configuration of an example non-limiting controller.
Figure 6:
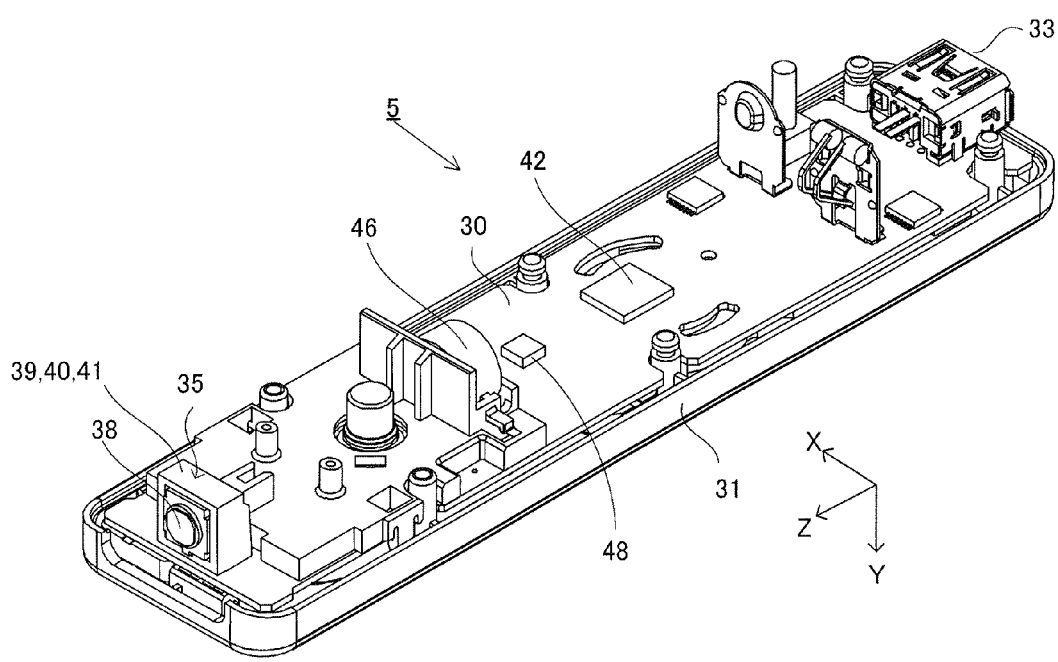
FIG. 6 is a diagram showing an internal configuration of an example non-limiting controller.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing section is the Z-axis positive direction, the image-capturing direction may be any direction. That is, the position of the image capturing/processing section 35 (the light incident surface 35*a* of the image capturing/processing section 35) in the controller 5 may not be on the front surface of the housing 31, but may be on any other surface on which light can be received from the outside of the housing 31.

Figure 7:
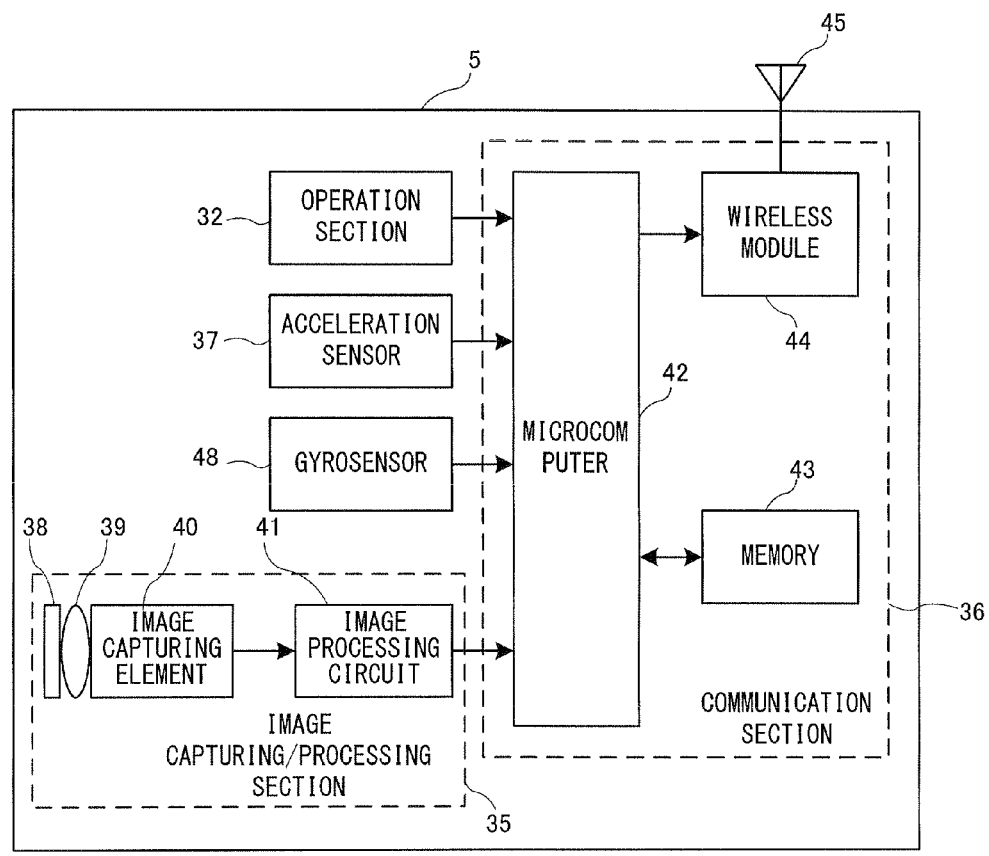
FIG. 7 is a block diagram showing a configuration of an example non-limiting controller.

FIG. 7 is a block diagram illustrating a configuration of the controller 5. The controller 5 includes an operation section 32 (the operation buttons 32*a* to 32*i*), the image capturing/processing section 35, a communication section 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation section 32 includes the operation buttons 32*a* to 32*i* described above, and outputs, to the microcomputer 42 of the communication section 36, operation button data indicating the input status of the operation buttons 32*a* to 32*i* (e.g., whether or not the operation buttons 32*a* to 32*i* are pressed).

The image capturing/processing section 35 is a system for analyzing image data captured by the image-capturing element and calculating the centroid, the size, etc., of an area(s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, an image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of a marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1 G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle(s) (or another suitable parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication section 36 to the controller communication module 19 is sequentially performed with a predetermined cycle, since the game process is generally performed with a cycle of 1/60 sec (as one frame period), the transmission may be performed with a cycle less than or equal to this period. The communication section 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

[4. Configuration of Terminal Device 7]

Figure 8:
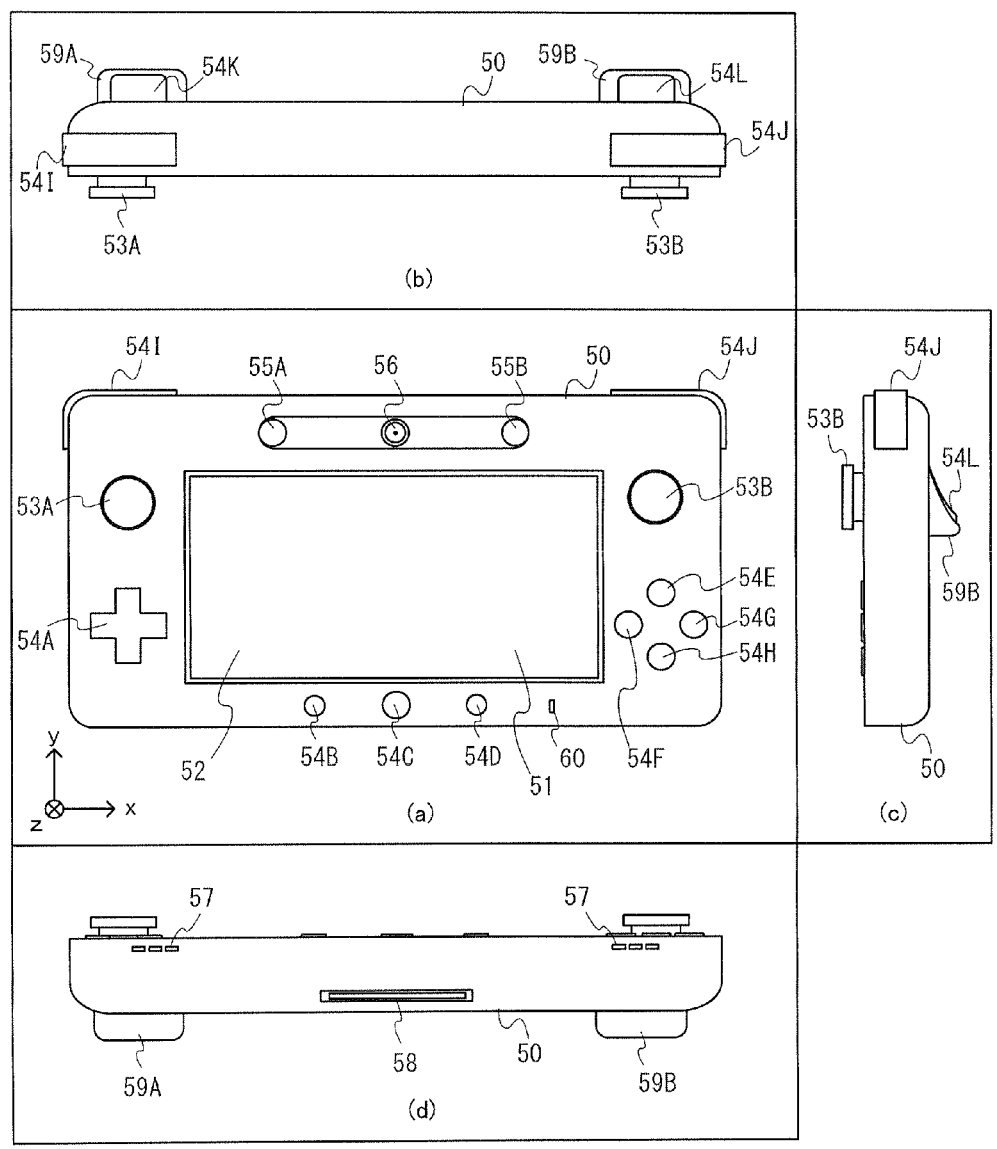
FIG. 8 is a diagram showing an external configuration of an example non-limiting terminal device.
Figure 9:
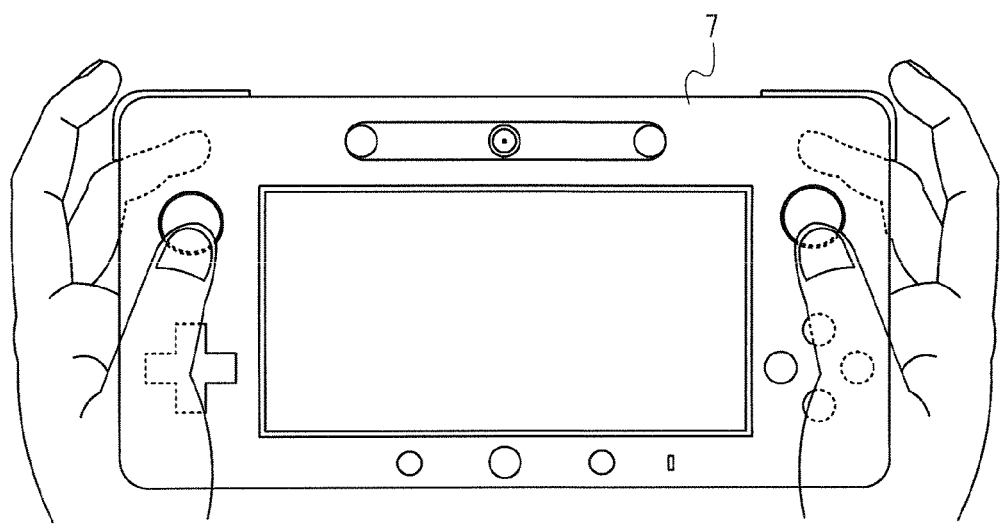
FIG. 9 is a diagram showing an example non-limiting terminal device being held by a user.
Figure 10:
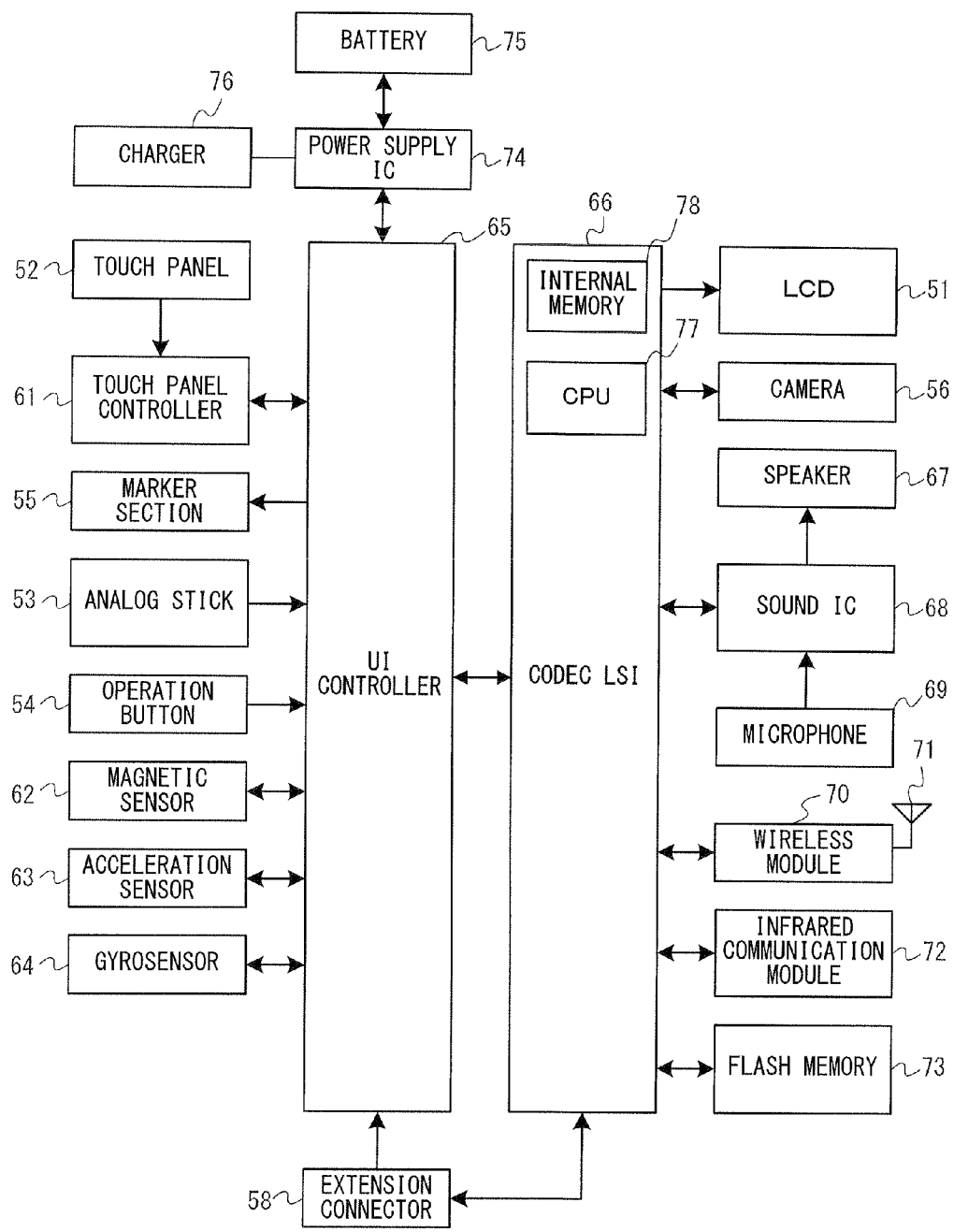
FIG. 10 is a block diagram showing an internal configuration of an example non-limiting terminal device.

Next, a configuration of a terminal device 7 will be described with reference to FIGS. 8 to 10. FIG. 8 is a diagram showing an external configuration of the terminal device 7. FIG. 8(*a*) is a front view of the terminal device 7, FIG. 8(*b*) is a top view thereof, FIG. 8(*c*) is a right side view thereof, and FIG. 8(*d*) is a bottom view thereof. FIG. 9 is a diagram showing a user holding the terminal device 7.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes an LCD 51 on the front surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. While FIG. 9 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(*a*), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen is usually used for making inputs on the touch panel 52, an input may be made on the touch panel 52 with a finger of the user, instead of using the touch pen. The housing 50 may be provided with a hole for accommodating the touch pen used for performing operations on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54L, as operation mechanisms. The analog sticks 53A and 53B are each a direction-specifying device. The analog sticks 53A and 53B are each configured so that the stick portion operated with a finger of the user can be slid or tilted in any direction (at any angle in the up, down, left, right and diagonal directions) with respect to the surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are operation mechanisms for making predetermined inputs. As will be discussed below, the buttons 54A to 54L are provided at such positions that the user can operate them while holding the left and right portions of the terminal device 7 (see FIG. 9). Therefore, the user can easily operate these operation mechanisms even when holding and moving the terminal device 7.

As shown in FIG. 8(*a*), the cross button (direction-input button) 54A and the buttons 54B to 54H, of the operation buttons 54A to 54L, are provided on the front surface of the housing 50. That is, these buttons 54A to 54G are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

As shown in FIGS. 8(*a*), 8(*b*) and 8(*c*), the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface. The first R button 54J is provided at the right end of the upper side surface of the housing 50, and is exposed on the upper right side surface. Thus, the first L button 54I is provided at such a position that it can be operated with the left index finger of the user, and the first R button 54J is provided at such a position that it can be operated with the right index finger of the user (see FIG. 9).

As shown in FIGS. 8(*b*) and 8(*c*), a second L button 54K and a second R button 54L are arranged on leg portions 59A and 59B which are provided so as to project from the back surface (i.e., the surface opposite to the front surface on which the LCD 51 is provided) of the plate-like housing 50. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to generally correspond to the left analog stick 53A provided on the front surface, and the second R button 54L is provided on the reverse side so as to generally correspond to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). As shown in FIG. 8(*c*), the second L button 54K and the second R button 54L are provided on diagonally-upwardly-facing surfaces of the leg portions 59A and 59B and have diagonally-upwardly-facing button surfaces. It is believed that the middle fingers will move in the up/down direction when the user holds the terminal device 7, and it will be easier for the user to press the second L button 54K and the second R button 54L if the button surfaces are facing upward. With the provision of leg portions on the back surface of the housing 50, it is easier for the user to hold the housing 50, and with the provision of buttons on the leg portions, it is easier to operate the housing 50 while holding the housing 50.

With the terminal device 7 shown in FIG. 8, since the second L button 54K and the second R button 54L are provided on the back surface, if the terminal device 7 is put down with the screen of the LCD 51 (the front surface of the housing 50) facing up, the screen may not be completely horizontal. Therefore, in other embodiments, three or more leg portions may be formed on the back surface of the housing 50. Then, since it can be put down on the floor surface with the leg portions in contact with the floor surface in a state where the screen of the LCD 51 is facing up, the terminal device 7 can be put down so that the screen is horizontal. A removable leg portion may be added so that the terminal device 7 is put down horizontally.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown, the terminal device 7 may include a button for turning ON/OFF the power of the terminal device 7. The terminal device 7 may also include a button for turning ON/OFF the screen display of the LCD 51, a button for performing a connection setting (pairing) with the game device 3, and a button for adjusting the sound volume of the speaker (the speaker 67 shown in FIG. 10).

As shown in FIG. 8(*a*), the terminal device 7 includes the marker section (the marker section 55 shown in FIG. 10) including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example.

The terminal device 7 includes a microphone (a microphone 79 shown in FIG. 10) as a sound input mechanism. A microphone hole 60 is provided on the front surface of the housing 50. The microphone 69 is provided inside the housing 50 behind the microphone hole 60. The microphone detects sounds around the terminal device 7 such as the voice of the user.

The terminal device 7 includes a speaker (the speaker 67 shown in FIG. 10) as a sound output mechanism. As shown in FIG. 8(*d*), speaker holes 57 are provided on the lower side surface of the housing 50. The output sounds from the speaker 67 are outputted from the speaker holes 57. In the present embodiment, the terminal device 7 includes two speakers, and the speaker holes 57 are provided at the respective positions of each of the left speaker and the right speaker.

The terminal device 7 includes an extension connector 58 via which another device can be connected to the terminal device 7. In the present embodiment, the extension connector 58 is provided on the lower side surface of the housing 50 as shown in FIG. 8(*d*). The other device connected to the extension connector 58 may be any device, and may be, for example, a game-specific controller (gun-shaped controller, etc.) or an input device such as a keyboard. The extension connector 58 may be omitted if there is no need to connect another device to terminal device 7.

With the terminal device 7 shown in FIG. 8, the shape of each operation button, the shape of the housing 50, the number and the positions of the components, etc., are merely illustrative, and the systems, methods, and techniques described herein may be implemented with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, and a battery 75. These electronic components are mounted on an electronic circuit board and accommodated in the housing 50.

The UI controller 65 is a circuit for controlling the input/output of data to/from various types of input/output sections. The UI controller 65 is connected to the touch panel controller 61, an analog stick 53 (the analog sticks 53A and 53B), an operation button 54 (the operation buttons 54A to 54L), the marker section 55, the magnetic sensor 62, the acceleration sensor 63, and the gyrosensor 64. The UI controller 65 is connected to the codec LSI 66 and the extension connector 58. The power supply IC 74 is connected to the UI controller 65, and power is supplied to various sections via the UI controller 65. The built-in battery 75 is connected to a power supply IC 74 to supply power. The charger 76 or a cable with which power can be obtained from an external power source via a connector, or the like, can be connected to the power supply IC 74, and the terminal device 7 can receive power supply from or be charged by an external power source using the charger 76 or the cable. The terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on signals from the touch panel 52, and outputs it to the UI controller 65. The touch position data represents, for example, the coordinates of a position on the input surface of the touch panel 52 at which an input is made. The touch panel controller 61 reads a signal from the touch panel 52 and generates touch position data at a rate of once per a predetermined amount of time. Various control instructions for the touch panel 52 are outputted from the UI controller 65 to the touch panel controller 61.

The analog stick 53 outputs, to the UI controller 65, stick data representing the direction and the amount of slide (or tilt) of the stick portion operated with a finger of the user. The operation button 54 outputs, to the UI controller 65, operation button data representing the input status of each of the operation buttons 54A to 54L (e.g., whether it is pressed).

The magnetic sensor 62 detects the azimuthal direction by sensing the size and direction of the magnetic field. Azimuthal direction data representing the detected azimuthal direction is outputted to the UI controller 65. Control instructions for a magnetic sensor 62 are outputted from the UI controller 65 to the magnetic sensor 62. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 62 may be any sensor as long as it is possible to detect the azimuthal direction. Strictly speaking, in a place where there is a magnetic field other than the geomagnetic field, the obtained azimuthal direction data does not represent the azimuthal direction.

The acceleration sensor 63 is provided inside the housing 50 for detecting the magnitude of the linear acceleration along each of the directions of the three axes (the x, y and z axes shown in FIG. 8(a)). Specifically, an acceleration sensor 63 detects the magnitude of the linear acceleration along each of the axes, where the x axis lies in the longitudinal direction of the housing 50, the y axis lies in the width direction of the housing 50, and the z axis lies in the direction vertical to the surface of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x-axis, the y-axis and the z-axis. Angular velocity data representing the detected angular velocities is outputted to the UI controller 65. Control instructions for a gyrosensor 64 are outputted from the UI controller 65 to the gyrosensor 64. The number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The UI controller 65 outputs, to the codec LSI 66, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 executes a minimal program for the management thereof and for the communication. When the terminal device 7 is started up, a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 66. Control instructions for the camera 56, such as an image-capturing instruction, are outputted from the codec LSI 66 to the camera 56. Camera 56 can also record video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs sound signals obtained by performing D/A conversion on the sound data to the speaker 67 so that sound is outputted from the speaker 67. The microphone 69 detects sounds propagated to the terminal device 7 (the sound of the user, etc.), and outputs sound signals representing such sounds to the sound IC 68. The sound IC 68 performs A/D conversion on the sound signals from the microphone 69 to output sound data of a predetermined format to the codec LSI 66.

The codec LSI 66 transmits, as terminal operation data, image data from the camera 56, sound data from the microphone 69 and operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 72 performs infrared communication in accordance with the IRDA standard, for example, with another device. The codec LSI 66 may transmit, to the game device 3, data received via infrared communication while it is included in the transmit data as necessary.

As described above, compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in data received from the game device 3, the codec LSI 66 and the UI controller 65 give control instructions to various sections in accordance with the control data. As described above, the control data is data representing control instructions for the components of the terminal device 7 (the camera 56, the touch panel controller 61, the marker section 55, sensors 62 to 64, and the infrared communication module 72 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, the analog stick 53 and the operation button 54, as described above, in other embodiments, other operation mechanisms may be included instead of, or in addition to, these operation mechanisms.

While the terminal device 7 includes the magnetic sensor 62, the acceleration sensor 63 and the gyrosensor 64 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Outline of Game Process]

Next, an outline of a game process to be performed in the game system of the present embodiment will be explained. The present embodiment is directed to a game process of performing a golf game in which a player performs game operations using the controller 5, as an example game process. In this game, by executing the operation (swing operation) of swinging the controller 5 as if it was a golf club, the player can have the player character execute a golf swing action in the virtual game space.

Figure 11:
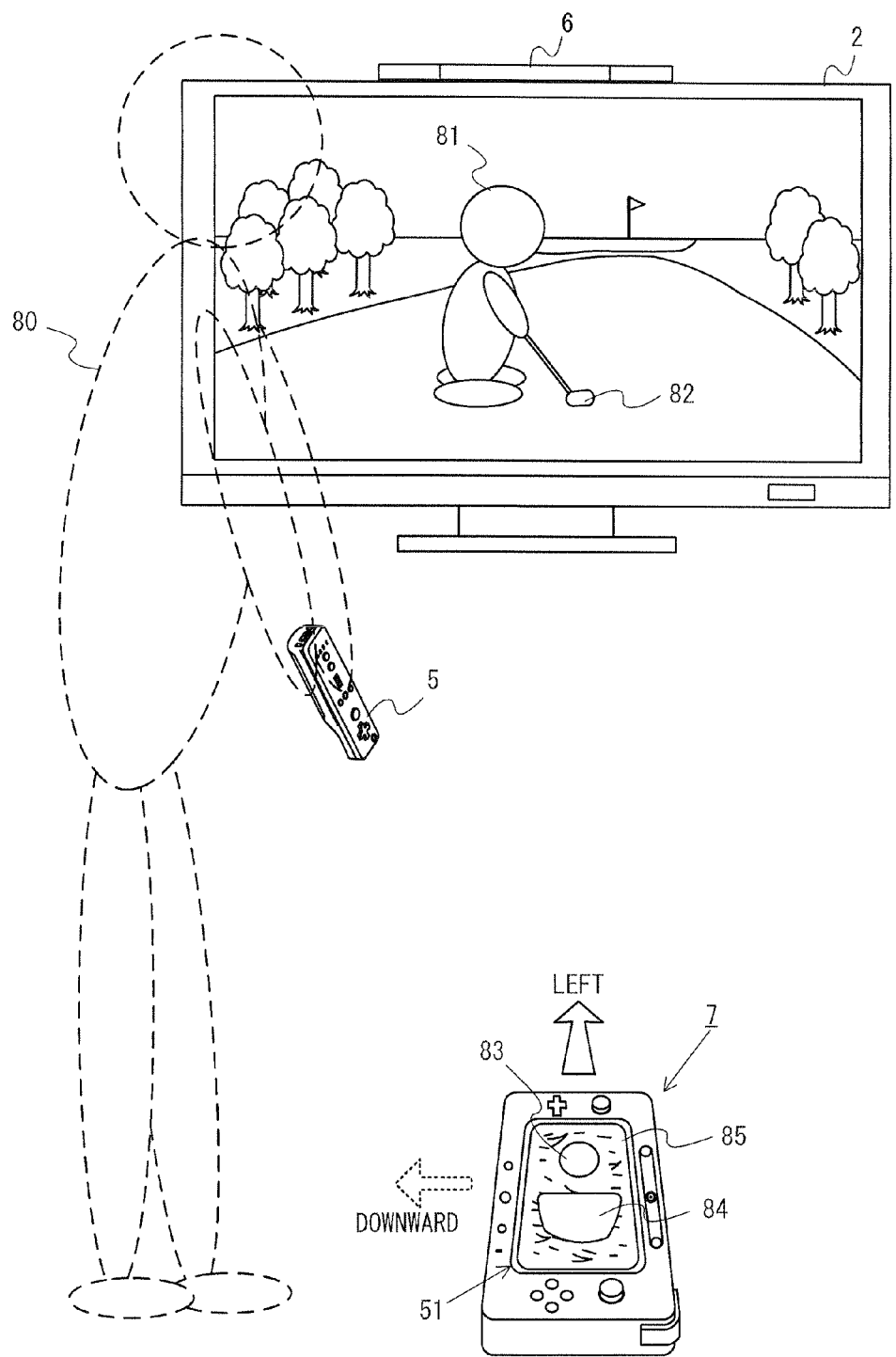
FIG. 11 is a diagram showing a player playing a game using an example non-limiting game system.

FIG. 11 is a diagram showing a player playing a game using a game system of the present embodiment. In FIG. 11, an image of the game space including (the object of) the player character 81 and (the object of) a golf club 82 is displayed on the screen of the television 2. Although it is not shown in FIG. 11 as it is hidden behind the golf club 82, (the object of) a ball placed in the game space is also displayed on the television 2. On the other hand, displayed on the terminal device 7 are an image (ball image) 83 representing the ball, an image (head image) 84 representing a portion of the golf club 82 (specifically, the head of the golf club), and an image (ground image) 85 representing the ground of the game space.

As shown in FIG. 11, the terminal device 7 is placed on the floor surface in front of the television 2 so that the screen of the LCD 51 faces vertically upward. The terminal device 7 is placed so that a predetermined direction of the terminal device 7 is directed toward the television 2. Herein, the predetermined direction is the left direction of the screen of the LCD 51 as seen from the front side (see the solid-line arrow shown in FIG. 11), and is the direction in which the ball image 83 moves on the screen of the LCD 51 (when the ball is hit by the golf club 82).

When playing a game, a player 80 stands at a position perpendicular to the predetermined direction of the terminal device 7 (the downward direction of the screen of the LCD 51 as seen from the front side in FIG. 11. See the dotted arrow shown in FIG. 11). At address when taking a golf swing, the player 80 stands at a position such that the tip direction of the controller 5 (the z-axis positive direction shown in FIG. 3) is directed toward the terminal device 7. The player 80 performs the swing operation standing in a position described above. Therefore, in the present embodiment, when the player 80 performs the swing operation, a ball will be displayed at a position where a ball would be placed in actual golf (see FIG. 11).

The action of the golf club 82 is controlled in response to the swing operation by the player 80. In the present embodiment, the attitude of the golf club 82 in the virtual game space is controlled based on the attitude of the controller 5 in the real space, the details of which will be described below. Thus, the player 80 can swing the golf club 82 (have the player character 81 swing the golf club 82) by swinging the controller 5.

The action of the golf club 82 is displayed on the television 2 and the terminal device 7. As shown in FIG. 11, the entirety of the swing action by the player character 81 is displayed on the television 2. That is, the entirety of the golf club 82 is displayed on the television 2.

Figure 12:
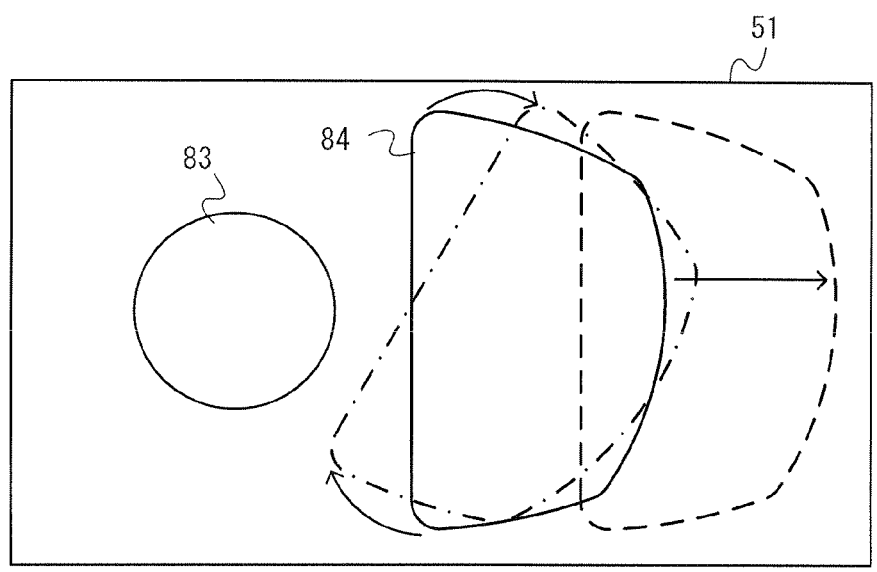
FIG. 12 is a diagram showing an example game image (terminal game image) displayed on an example non-limiting terminal device.

On the other hand, on the terminal device 7, a view of the surroundings around the ball (before it is hit by the golf club 82). FIG. 12 is a diagram showing an example game image (terminal game image) displayed on the terminal device 7. As shown in FIG. 12, on the LCD 51 of the terminal device 7, the ball image 83 representing the ball is displayed, and the head image 84 representing the head of the golf club 82 is displayed which is dependent on the attitude of the controller 5. Although not shown in FIG. 12 for the sake of simplicity, the ground image 85 representing the ground of the game space is displayed, in addition to the ball image 83 and the head image 84, on the terminal device 7 (see FIG. 11).

In the present embodiment, the position and the direction of the head image 84 displayed on the terminal device 7 changes based on the attitude of the golf club 82 in the game space, in other words, based on the attitude of the controller 5. As the player changes the attitude of the controller 5, the position of the head image 84 on the screen of the terminal device 7 (see the dotted line shown in FIG. 12) or the direction of the head image 84 (see the one-dot-chain line shown in FIG. 12) changes, the details of which will be described below. Thus, with the present embodiment, a view of the surroundings around the ball is realistically represented by the terminal game image. The player 80 can, for example, check the direction of the head or check the condition of the ground on which the ball is placed (the lie, e.g., the condition of the grass, how much the ball is buried in the sand of a bunker, etc.) by looking at the terminal game image before performing a swing operation.

When the golf club 82 strikes the ball as a result of the player 80 performing a swing operation to swing the golf club 82, the ball travels (flies). In the present embodiment, the head image 84 is displayed on the terminal device 7 when the tip direction of the controller 5 is directed toward the terminal device 7, and the golf club 82 strikes the ball when the tip direction is directed toward the ball image 83. Therefore, by performing a swing operation with the controller 5 as if to hit the ball image 83 displayed on the terminal device 7, the player 80 can make the golf club 82 strike the ball.

In a case in which the ball travels in response to a swing operation, the game image (television game image) displayed on the television 2 is generated so as to include the moving ball. That is, the position and the attitude of the virtual camera used to generate the television game image are controlled so that the moving ball is included within the image-capturing range. An image representing the game space as seen from the virtual camera is generated as the television game image. On the other hand, on the terminal device 7, when the golf club 82 strikes the ball, the ball immediately moves out of the screen as a result of traveling in the left direction of the LCD 51. Therefore, in the present embodiment, how the ball travels is displayed primarily on the television 2. The player 80 can check the location of the ball which was flown as a result of the swing operation on the television game image displayed on the television 2.

As described above, with the present embodiment, the ball image 83 is displayed on the screen of the terminal device 7 which is placed on the floor surface in front of the player 80. Thus, the ball image 83 is displayed at a position where the ball would be placed in actual golf. Then, by performing a swing operation using the controller 5, at the ball image 83 which is displayed on the terminal device 7, the player 80 can hit the ball in the game space. Therefore, with the present embodiment, the swing operation of hitting the ball can be made more realistic.

In the present embodiment, since the terminal device 7 is placed on the floor surface, the terminal device 7 may not be able to display the ball traveling after the swing operation in an easily viewable manner. In the present embodiment, however, the traveling ball is displayed on the television 2, it is possible to reliably present to the player 80 the behavior of the ball after the start of the ball travel following an operation by the player 80. Thus, with the present embodiment, it is possible to provide a realistic operation to the player 80 and to present an easy-to-view game image to the player 80.

In the present embodiment, the attitude of the golf club 82 is controlled based on the attitude of the controller 5, and the image (head image 84) representing a portion of the golf club 82 is displayed on the terminal device 7 when the tip direction of the controller 5 is directed toward the terminal device 7 (see FIG. 12). Thus, by directing the tip direction of the controller 5 toward the terminal device 7, the player 80 can feel that the attitude of the golf club 82 in the virtual space corresponds to the attitude of the controller 5 in the real space. That is, since the player 80 can feel as if the player 80 was swinging an actual golf club through the swing operation, the swing operation can be made more realistic with the present embodiment.

In the present embodiment, the head image 84 representing a portion of the golf club 82 is displayed on the terminal device 7 only when the controller 5 is in a particular attitude. Therefore, the player may not be able to grasp the position/attitude of the golf club 82 in the game space with only the terminal game image displayed on the terminal device 7. In the present embodiment, however, since the entirety of the golf club 82 (and the player character 81) is displayed on the television 2, the player can easily grasp the position and the attitude of the golf club from the television game image displayed on the television 2. Thus, with the present embodiment, it is possible to provide a realistic operation to the player and to present to the player a game image which makes it easier to perform the operation.

[6. Details of Game Processes]

Figure 13:
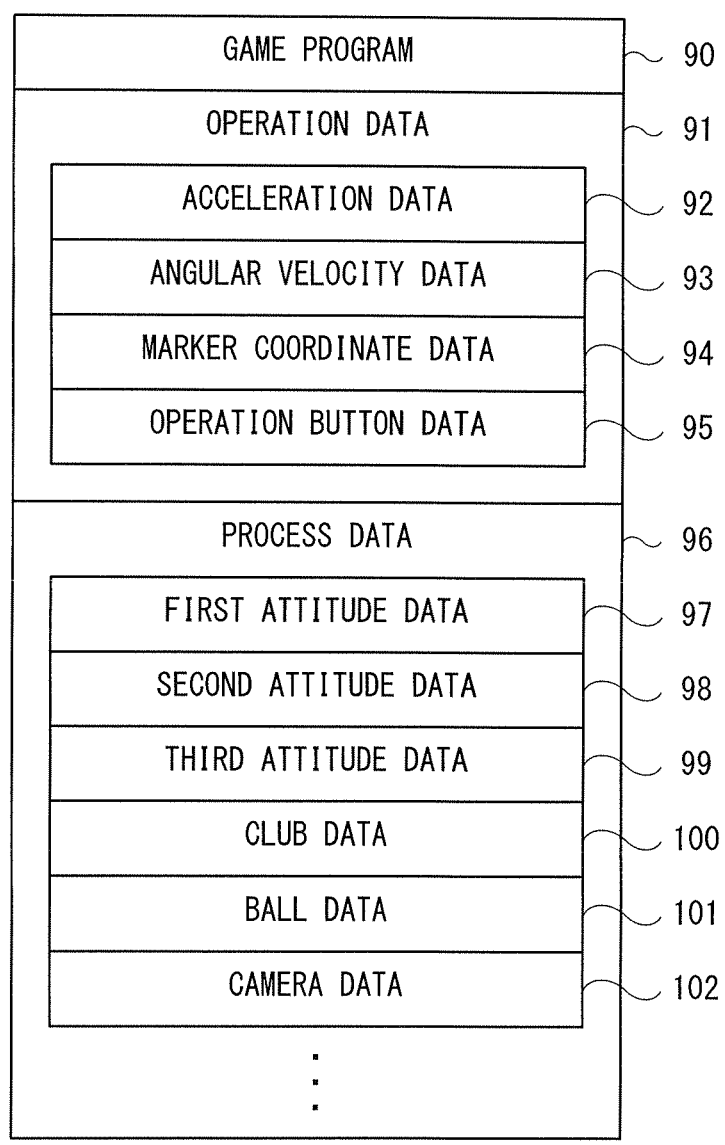
FIG. 13 is a diagram showing an example of example non-limiting various data used in a game process.

Next, the details of game processes performed by the present game system will be described. First, various data used in the game process will be described. FIG. 13 is a diagram showing various data used in the game processes. FIG. 13 shows primary data to be stored in the main memory (the external main memory 12 or the internal main memory 11*e*) of the game device 3. As shown in FIG. 13, the main memory of the game device 3 stores a game program 90, operation data 91 and process data 96. In addition to those shown in FIG. 13, the main memory also stores other data used in the game, such as image data of various objects appearing in the game, and sound data used in the game, etc.

At an appropriate point in time after the power of the game device 3 is turned ON, a part or whole of the game program 90 is loaded from the optical disc 4 and stored in the main memory. The game program 90 may be obtained from an external device of the game device 3 (e.g., via the Internet), instead of from the optical disc 4. A part of the game program 90 (e.g., a program for calculating the attitude of the controller 5 and/or the terminal device 7) may be pre-stored in the game device 3.

The operation data 91 is data representing an operation performed by a user on the controller 5 the controller operation data described above). The operation data 91 is transmitted from the controller 5 and obtained by the game device 3. The operation data 91 includes acceleration data 92, angular velocity data 93, marker coordinate data 94 and operation button data 95. The main memory may store a predetermined number of latest (most recently obtained) sets of operation data.

The acceleration data 92 is data representing the acceleration (acceleration vector) detected by the acceleration sensor 37. While the acceleration data 92 represents three-dimensional acceleration of which each component is the acceleration for one of the three axes of x, y and z shown in FIG. 3, it may represent acceleration for any one or more directions in other embodiments.

The angular velocity data 93 is data representing the angular velocity detected by the gyrosensor 48. While the angular velocity data 93 represents angular velocity about each of the three axes of x, y and z shown in FIG. 3, it may represent angular velocity about any one or more axes in other embodiments.

The marker coordinate data 94 is data representing coordinates calculated by the image processing circuit 41 of the image capturing/processing section 35, i.e., the marker coordinates. The marker coordinates are represented in a two-dimensional coordinate system for representing a position on a plane corresponding to the captured image, and the marker coordinate data 94 represents the coordinate values in the two-dimensional coordinate system. In a case in which the image capturing element 40 captures an image of the two markers 55*a* and 55*b* of the marker section 55, two sets of marker coordinates are calculated, and the marker coordinate data 94 represents two sets of marker coordinates. In a case in which one of the markers 55*a* and 55*b* is not present within the image-capturing range of the image capturing element 40, the image capturing element 40 captures an image of one marker, and only one set of marker coordinates is calculated. As a result, the marker coordinate data 94 represents one set of marker coordinates. In a case in which neither one of the markers 55a and 55b is present within the image-capturing range of the image capturing element 40, the image capturing element 40 does not capture an image of markers, and marker coordinates are not calculated. Therefore, the marker coordinate data 94 may represent two sets of marker coordinates, represent one set of marker coordinates, or indicate that there is no marker coordinate.

The image data itself of the captured image may be transmitted from the controller 5 to the game device 3, instead of the marker coordinate data. The controller 5 may transmit the marker coordinate data or the image data itself, as captured image data of the image captured by the image-capturing device (the image capturing element 40). At this instant, the game device 3 may calculate the marker coordinates from the image data of the captured image, and store the marker coordinates in the main memory as the marker coordinate data.

The acceleration data 92, the angular velocity data 93 and the marker coordinate data 94 are data based on the attitude of the controller 5 (data whose values vary based on the attitude). The attitude of the controller 5 can be calculated based on these data 92 to 94, the details of which will be described below. In other embodiments, other types of data based on the attitude of the controller 5, such as for example data representing the azimuthal direction detected by a magnetic sensor, etc., may be used together with these data 92 to 94 (or instead of these data 92 to 94) in order to calculate the attitude of the controller 5.

The operation button data 95 is data representing the input status of the operation buttons 32a to 32i provided on the controller 5.

As long as the operation data 91 represents the operation of the player operating the controller 5, it may include only some of the data 92 to 95. In a case in which the controller 5 includes another input mechanism (e.g., a touch panel, an analog stick, or the like), the operation data 91 may include data representing the operation on the other input mechanism. In a case in which the movement of the controller 5 itself is used as the game operation as in the present embodiment, the operation data 91 includes data whose value varies based on the movement of the controller 5 itself, such as the acceleration data 92, the angular velocity data 93 or the marker coordinate data 94.

Figure 14:
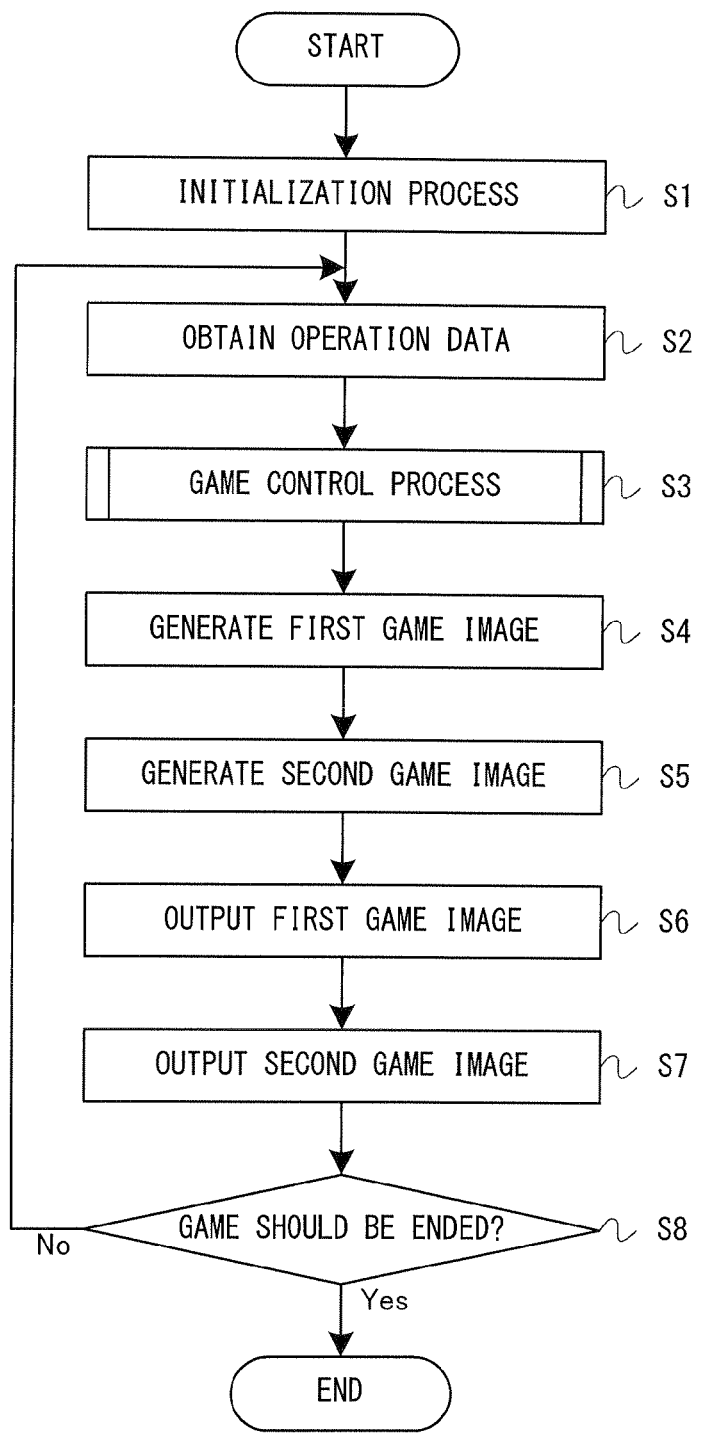
FIG. 14 is a main flow chart showing an example flow of a game process performed by a game device.

The process data 96 is data used in game processes to be described below (FIG. 14). The process data 96 includes first attitude data 97, second attitude data 98, third attitude data 99, club data 100, ball data 101 and camera data 102. In addition to the data shown in FIG. 13, the process data 96 includes various data used in game processes such as data representing various parameters set for various objects (e.g., parameters for the player character).

The first attitude data 97 is data representing the attitude of the controller 5 calculated based on the angular velocity data 93 (hereinafter referred to as the "first attitude"). The second attitude data 98 is data representing the attitude of the controller 5 calculated based on the acceleration data 92 (hereinafter referred to as the "second attitude"). The third attitude data 99 is data representing the attitude of the controller 5 calculated based on the marker coordinate data 94 (hereinafter referred to as the "third attitude"). In the present embodiment, the final attitude of the controller 5 is calculated based on three different attitudes, which are calculated by different methods, the details of which will be described below.

The club data 100 is data representing the position and the attitude of the golf club 82 in the game space. The position and the attitude of the golf club 82 are calculated based on the attitude of the controller 5, the details of which will be described below. In the present embodiment, in order to calculate the velocity of the golf club 82 (the average velocity over the predetermined number of latest frames), a predetermined number of latest sets of club data are stored in the main memory.

The ball data 101 is data representing the position of the ball in the game space. The ball travels in response to being struck by the golf club 82. The traveling velocity and the traveling direction of the ball are determined based on the velocity and the attitude of (the head of) the golf club 82 at the point when it contacted the ball.

The camera data 102 is data representing the position and the attitude of the virtual camera in the game space, which is used to generate the television game image. In the present embodiment, the virtual camera is set so that an image of the game space including the ball is generated (so that the ball is included within the viewing field range).

Next, the details of the game processes performed by the game device 3 will be described with reference to FIGS. 14 to 17. FIG. 14 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program stored in the optical disc 4 immediately after power-up, or it may be configured so that a built-in program is executed after power-up for displaying a predetermined menu screen first, and then the game program is executed when the start of the game is instructed by a player, for example. The flow chart shown in FIG. 14 is a flow chart showing the process to be performed after processes described above are completed.

Figure 15:
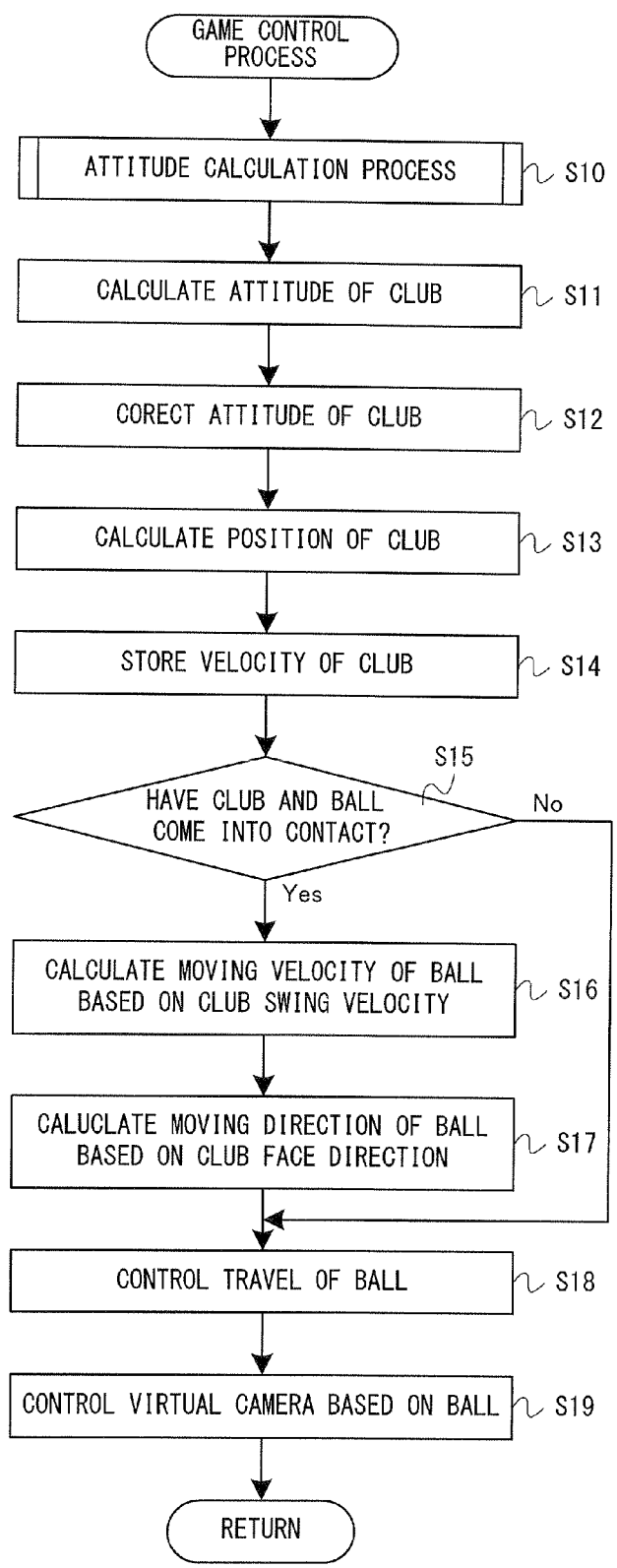
FIG. 15 is a flow chart showing an example detailed flow of a game control process (step S3) shown in FIG. 14.
Figure 16:
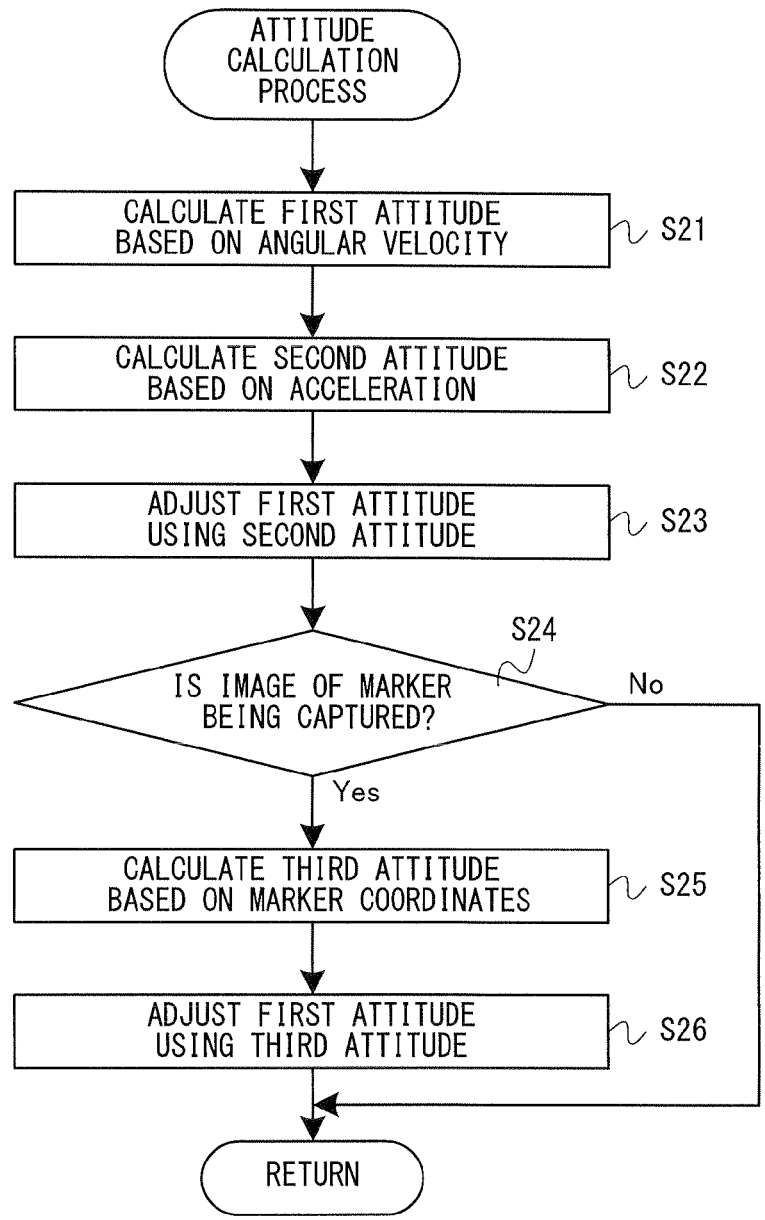
FIG. 16 is a flow chart showing an example detailed flow of an attitude calculation process (step S10) shown in FIG. 15.

The processes of the steps of the flow chart shown in FIGS. 14 to 16 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. In the present embodiment, data representing the initial position of the ball is stored as the ball data 101 in the main memory in the initialization process. The process of step S2 is performed, following step S1. Thereafter, the process loop including a series of processes of steps S2 to S8 is repeatedly performed at a rate of once per a predetermined amount of time (a one frame period).

In step S2, the CPU 10 obtains operation data from the controller 5. The controller 5 repeatedly transmits, as the operation data, various data outputted from the acceleration sensor 37, the gyrosensor 48, the image capturing/processing section 35 and the operation section 32, to the game device 3. The game device 3 successively receives the data from the controller 5, and successively stores the data as the operation data 91 in the main memory. In step S2, the CPU 10 reads out the latest operation data 91 from the main memory. The process of step S3 is performed, following step S2.

In the present embodiment, since the terminal device 7 is not used as the controller device, it is assumed that the CPU 10 does not obtain the terminal operation data from the terminal device 7. In other embodiments, the CPU 10 may obtain the terminal operation data in step S2, store it in the main memory, and use the terminal operation data in the game control process to be described below.

In step S3, the CPU 10 performs the game control process. The game control process allows the game to progress by performing processes of moving objects in the game space, for example, in response to game operations by the player. In the game control process of the present embodiment, the movement (attitude) of the controller 5 is calculated based on the operation data 91, and the ball in the game space travels based on the movement. Specifically, the process of detecting a player operation, the process of controlling the action of the golf club 82 based on the player operation, the process of moving the ball based on the action of the golf club 82, etc., are performed in the game control process. The details of the game control process will now be described with reference to FIG. 15.

FIG. 15 is a flow chart showing a detailed flow of the game control process (step S3) shown in FIG. 14. First, in the game control process, in step S10, the CPU 10 performs the attitude calculation process of calculating the attitude of the controller 5. While the attitude of the controller 5 may be calculated by any method as long as it is calculated based on the operation data 91, the attitude of the controller 5 is calculated in the present embodiment by adjusting the first attitude based on the angular velocity using the second attitude based on the acceleration and the third attitude based on the marker coordinates. The program for performing the attitude calculation process may be stored in the game device 3 as a library separately from the game program 90. The details of the attitude calculation process will now be described with reference to FIG. 16.

FIG. 16 is a flow chart showing a detailed flow of the attitude calculation process (step S10) shown in FIG. 15. First, in the attitude calculation process, in step S21, the CPU 10 calculates the first attitude of the controller 5 based on the angular velocity of the controller 5. While the method for calculating the first attitude of the controller 5 may be any method, the first attitude is calculated in the present embodiment based on the previous first attitude (the first attitude calculated in a previous iteration) and the current angular velocity (the angular velocity obtained in step S2 in a current iteration of the process loop). Specifically, the CPU 10 calculates the new first attitude by rotating the previous first attitude by a unit time's worth of the current angular velocity. The previous first attitude is represented by the first attitude data 97 stored in the main memory, and the current angular velocity is represented by the angular velocity data 93 stored in the main memory. Therefore, the CPU 10 reads out the first attitude data 97 and the angular velocity data 93 from the main memory to calculate the first attitude of the controller 5. The data representing the first attitude calculated in step S21 is stored in the main memory as the first attitude data 97. The process of step S22 is performed, following step S21 described above.

Where the attitude is calculated from the angular velocity, an initial attitude may be set. That is, where the attitude of the controller 5 is calculated from the angular velocity, the CPU 10 initially calculates the initial attitude of the controller 5. The initial attitude of the controller 5 may be calculated based on the acceleration data, or the player may be prompted to perform a predetermined operation with the controller 5 in a particular attitude so that the particular attitude at the point in time when the predetermined operation is performed is used as the initial attitude. The initial attitude may be calculated in a case in which the attitude of the controller 5 is calculated as an absolute attitude with respect to a predetermined direction in the space. The initial attitude may not be calculated in a case in which the attitude of the controller 5 is calculated as a relative attitude with respect to the attitude of the controller 5 at the start of the game, for example.

In step S22, the CPU 10 calculates the second attitude of the controller 5 based on the acceleration of the controller 5. Specifically, the CPU 10 reads out the acceleration data 92 from the main memory, and calculates the attitude of the controller 5 based on the acceleration data 92. In a state in which the controller 5 is substantially stationary, the acceleration acting upon the controller 5 means the gravitational acceleration. Therefore, in this state, the direction (attitude) of the controller 5 with respect to the direction of the gravitational acceleration detected (direction of gravity) can be calculated based on the acceleration data 92. Thus, in a state in which the acceleration sensor 37 detects the gravitational acceleration, the attitude of the controller 5 with reference to the direction of gravity can be calculated based on the acceleration data 92. Data representing the attitude calculated as described above is stored in the main memory as the second attitude data 98. The process of step S23 is performed, following step S22.

In step S23, the CPU 10 adjusts the first attitude based on the angular acceleration using the second attitude based on the acceleration. Specifically, the CPU 10 reads out the first attitude data 97 and the second attitude data 98 from the main memory and makes an adjustment such that the first attitude is brought closer to the second attitude at a predetermined rate. The predetermined rate may be a predetermined fixed value or may be set based on the detected acceleration, etc. Whether the controller 5 is stationary or not can be estimated based on whether the magnitude of the detected acceleration is close to the magnitude of the gravitational acceleration. Therefore, for example, the CPU 10 may increase the rate at which the first attitude is brought closer to the second attitude when the magnitude of the detected acceleration is close to the magnitude of the gravitational acceleration, and decrease the rate when the magnitude of the detected acceleration is remote from the magnitude of the gravitational acceleration. For the second attitude, since the attitude cannot be calculated for the rotation direction about the axis along the direction of gravity, the CPU 10 may not make the adjustment for the rotation direction. Data representing the adjusted attitude obtained as described above is stored in the main memory as the new first attitude data 97. The process of step S24 is performed, following step S23.

In step S24, the CPU 10 determines whether the image-capturing mechanism (the image capturing element 40) of the controller 5 has captured an image of the marker section 55. The determination of step S24 can be made by referencing the marker coordinate data 94 stored in the main memory. Herein, it is determined that an image of the marker section 55 has been captured when the marker coordinate data 94 represents two sets of marker coordinates, and it is determined that an image of the marker section 55 has not been captured when the marker coordinate data 94 represents only one set of marker coordinates or when it indicates that there is no marker coordinate. In a case in which the determination result of step S24 is affirmative, subsequent processes of steps S25 and S26 are performed. On the other hand, in a case in which the determination result of step S24 is negative, the CPU 10 ends the attitude calculation process, skipping the process of steps S25 and S26. Thus, in a case in which the image capturing element 40 has not captured an image of the marker section 55, the attitude of the controller 5 (third attitude) cannot be calculated using data obtained from the image capturing element 40, in which case the adjustment using the third attitude is not performed.

In other embodiments, in step S24, the CPU 10 may further determine whether the tip direction of the controller 5 (the Z-axis positive direction) is downward. Then, only if the direction is determined to be downward, the CPU 10 determines that the image-capturing mechanism of the controller 5 has captured an image of the marker section 55. If the direction is determined to be not downward, it is determined that the image-capturing mechanism has not captured an image of the marker section 55 (even if the marker coordinate data 94 represents two sets of marker coordinates). Whether the tip direction of the controller 5 is downward is determined by using the first attitude calculated in step S21, the second attitude calculated in step S22, and the first attitude adjusted in step S23. Then, even if the image capturing/processing section 35 calculates marker coordinates while incorrectly recognizing an object which is not the marker section 55 as being the marker section 55, the third attitude will not be calculated based on erroneous marker coordinates, and it is therefore possible to precisely calculate the attitude of the controller 5.

In step S25, the CPU 10 calculates the third attitude of the controller 5 based on the marker coordinates. Since the marker coordinates represent the positions of the markers 55*a* and 55*b* in the captured image, it is possible to calculate the attitude of the controller 5 from these positions. The method for calculating the attitude of the controller 5 based on the marker coordinates will now be described with reference to FIG. 17.

Figure 17:
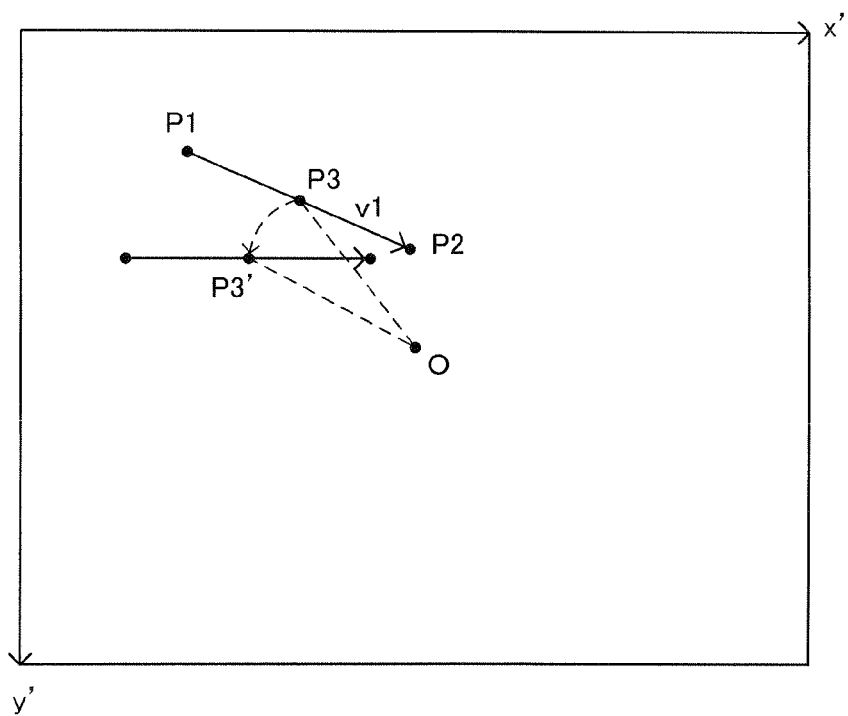
FIG. 17 is a diagram showing example two-dimensional coordinates corresponding to a captured image.

FIG. 17 is a diagram showing two-dimensional coordinates corresponding to the captured image. In FIG. 17, the point P1 represents the position of the marker 55*a*, the point P2 represents the position of the marker 55*b*, and the point P3 represents the middle point between the point P1 and the point P2. The vector v1 is a vector whose start point is the point P1 and whose end point is the point P2. In the present embodiment, the two-dimensional coordinate system for representing positions in the captured image is an x'y' coordinate system. Herein, the attitude of the controller 5 when the point P3 is located at the center of the captured image and the vector v1 is facing in the x'-axis positive direction is the reference attitude. The roll direction, the yaw direction and the pitch direction as used hereinbelow refer to the rotation direction about the Z axis, the rotation direction about the Y axis and the rotation direction about the X axis, respectively, of the controller 5 in the reference attitude.

First, the attitude for the roll direction (the rotation direction about the Z axis) can be calculated from the gradient of the straight line extending between the position of the marker 55*a* and the position of the marker 55*b* in the captured image. That is, when calculating the attitude for the roll direction, the CPU 10 first calculates the vector v1 from two sets of marker coordinates. Since the direction of the vector v1 varies based on the rotation of an input device 8 in the roll direction, the CPU 10 can calculate the attitude for the roll direction based on the vector v1. For example, the attitude for the roll direction may be calculated as a rotation matrix for rotating the vector v1 in the reference attitude to the current vector v1, or may be calculated as an angle between the vector v1 in the reference attitude and the current vector v1.

In the present embodiment, since it is expected that the player stands at a particular position with respect to the terminal device 7 to perform a particular operation (swing operation), it can be determined that the position of the controller 5 is generally constant in a case in which the image capturing element 40 captures an image of the terminal device 7. Therefore, the attitude of the controller 5 with respect to the pitch direction (the rotation direction about the X axis) and the yaw direction (the rotation direction about the Y axis) can be calculated based on the position of the marker section 55 in the captured image. For example, when the positions of the markers 55*a* and 55*b* are moved to the left (right) in the captured image from the positions in the reference attitude, it can be determined that the attitude of the controller 5 has been changed to the right (left). When the positions of the markers 55*a* and 55*b* are moved up (down) in the captured image from the positions in the reference attitude, it can be determined that the attitude of the controller 5 has been changed down (up).

Specifically, the CPU 10 first calculates the coordinates of the middle point P3 between the two sets of marker coordinates. That is, in the present embodiment, the position of the middle point P3 is used as the position of the marker section 55 in the captured image. Next, the CPU 10 calculates the position P3' obtained by rotating the middle point P3 (in a direction opposite to the rotation direction of the controller 5) over a rotation angle of the controller 5 for the roll direction about the origin O of the x'y' coordinate system as the center of rotation (see FIG. 17). In other words, the middle point P3 is rotated about the origin O as the center of rotation so that the vector v1 faces the x'-axis positive direction.

It is possible to calculate the attitude for the yaw direction and the attitude for the pitch direction from the position P3' obtained by rotating the middle point P3 as described above. Specifically, the rotation angle (the rotation angle from the reference attitude) $\theta y$ of the controller 5 for the yaw direction can be calculated based on the x' coordinate value px of the position P3' which is the rotated middle point, and the angle (referred to as the limit angle) $\theta y'$ for the yaw direction where the marker section 55 is located at the end in the x'-axis direction. The limit angle $\theta y$, and the x coordinate value px' of the position P3', which is obtained by rotating the middle point, at the limit angle, can be obtained in advance. Therefore, the rotation angle $\theta y$ can be calculated based on the fact that the ratio between px and px' is equal to the ratio between $\theta y$ and $\theta y'$.

Also for the pitch direction, the attitude of the controller 5 can be calculated as for the yaw direction. That is, the rotation angle of the controller 5 for the pitch direction can be calculated based on the y' coordinate value of the position P3' of the rotated middle point and the angle of the pitch direction where the marker section 55 is located at the end in the y'-axis direction.

Thus, in step S25, the CPU 10 reads out the marker coordinate data 94 from the main memory, and calculates the attitude for the roll direction and the attitude for the yaw direction based on two sets of marker coordinates. In the present embodiment, the attitude of the golf club 82 is adjusted for the pitch direction (step S12) in order to simplify the swing operation, the details of which will be described below. The CPU 10 does not need to accurately calculate the attitude for the pitch direction based on marker coordinates. In the present embodiment, the CPU 10 uses the same attitude as the first attitude for the pitch direction. By calculating the attitude for the roll direction, the attitude for the yaw direction and the attitude for the pitch direction as described above, it is possible to calculate the third attitude. Where the attitudes for different directions are calculated as rotation matrices, the third attitude can be obtained by multiplying the rotation matrices of the directions by one another. The data representing the calculated third attitude is stored in the main memory as the third attitude data 99. The process of step S26 is performed, following step S25.

In the present embodiment, the CPU 10 calculates the attitudes for the roll direction and the yaw direction based on marker coordinates, and uses the same attitude as the first attitude for the pitch direction. That is, the process of adjusting the attitude using marker coordinates is not performed for the pitch direction. In other embodiments, the CPU 10 may calculate the attitude for the pitch direction based on marker coordinates by a method similar to that for the yaw direction, and may adjust the attitude for the pitch direction using marker coordinates.

In step S26, the CPU 10 adjusts the first attitude based on the angular velocity by using the third attitude based on marker coordinates. Specifically, the CPU 10 reads out the first attitude data 97 and the third attitude data 99 from the main memory and makes an adjustment such that the first attitude is brought closer to the third attitude at a predetermined rate. The predetermined rate may be a predetermined fixed value, for example. The first attitude to be adjusted is the first attitude after the adjustment using the second attitude by the process of step S23. Data representing the adjusted attitude obtained as described above is stored in the main memory as the new first attitude data 97. The first attitude data 97 after the adjustment process of step S26 is used as the final attitude of the controller 5 in the calculation of the attitude of the golf club 82. The CPU 10 ends the attitude calculation process after step S26.

With the attitude calculation process, using the acceleration data 92 and the marker coordinate data 94, the CPU 10 adjusts the first attitude of the controller 5, calculated based on the angular velocity data 93. With the method using the angular velocity, among other methods for calculating the attitude of the controller 5, it is possible to calculate the attitude no matter how the controller 5 is moving. With the method using the angular velocity, since the attitude is calculated by accumulating the angular velocity which is detected successively, the precision may deteriorate due to accumulating errors, etc., or the precision of the gyrosensor 48 may deteriorate due to a so-called "temperature drift" problem. With the method using the acceleration, errors do not accumulate, but the attitude cannot be calculated precisely in a situation where the controller 5 is moved violently (because the direction of gravity cannot then be detected accurately). With the method using marker coordinates, the attitude can be calculated precisely (particularly for the roll direction), but the attitude cannot be calculated in a state where it is not possible to capture an image of the marker section 55. In contrast, with the present embodiment, since three different methods of a different nature, described above, are used, it is possible to more accurately calculate the attitude of the controller 5. In other embodiments, the attitude may be calculated using one or two of the three methods described above.

Referring back to FIG. 15, the process of step S11 is performed, following the attitude calculation process of step S10. In step S11, the CPU 10 calculates the attitude of the golf club 82 based on the attitude of the controller 5. That is, the CPU 10 reads out the first attitude data 97 from the main memory, and calculates the attitude of the golf club 82 based on the first attitude. Herein, the attitude of the golf club 82 is calculated so as to correspond to the attitude of the controller 5. Specifically, in a case in which the reference attitude is defined as being the attitude of the golf club 82 where the controller 5 is in the reference attitude, the attitude of the golf club 82 is set to be an attitude that is obtained by rotating the golf club 82 from the reference attitude in a direction in accordance with the direction in which the controller 5 has rotated from the reference attitude and by an amount of rotation in accordance with the amount of rotation of the controller 5 from the reference attitude. The reference attitude of the controller 5 is an attitude such that the image-capturing direction of the controller 5 is directed toward the marker coordinates of the terminal device 7, and in a case in which the terminal game image shown in FIG. 12 is displayed, is an attitude facing slightly upper right of the ball image 83. Therefore, the reference attitude of the golf club 82 is defined to be an attitude such that the shaft of the golf club 82 faces slightly upper right of the ball. Thus, in step S11, the attitude of the golf club 82 is calculated based on the attitude of the controller 5 so that the relationship between the controller 5 in the real space and the ball image 83 displayed on the terminal device 7 coincides with the relationship between the golf club 82 and the ball in the virtual game space. Data representing the attitude of the golf club 82 calculated as described above is stored in the main memory. The process of step S12 is performed, following step S11.

In step S12, the CPU 10 adjusts the attitude of the golf club 82 calculated in step S11. Herein, the attitude calculated in step S11 is calculated so as to coincide with the attitude of the controller 5 in the real space. Therefore, assuming that the attitude calculated in step S11 is used as it is, when the player performs a swing operation, the path of the golf club 82 may not always pass through the position of the ball, and there may be instances where it does not pass through the position of the ball. That is, even if a swing operation is performed, the golf club 82 may possibly miss the ball (a whiff). Thus, where the attitude calculated in step S11 is used as it is, the difficulty level of the swing operation may become too high. In light of this, in the present embodiment, the CPU 10 adjusts the attitude of the golf club 82 so that a swing operation does not result in a whiff. The adjustment process of step S12 will now be described with reference to FIG. 18.

Figure 18:
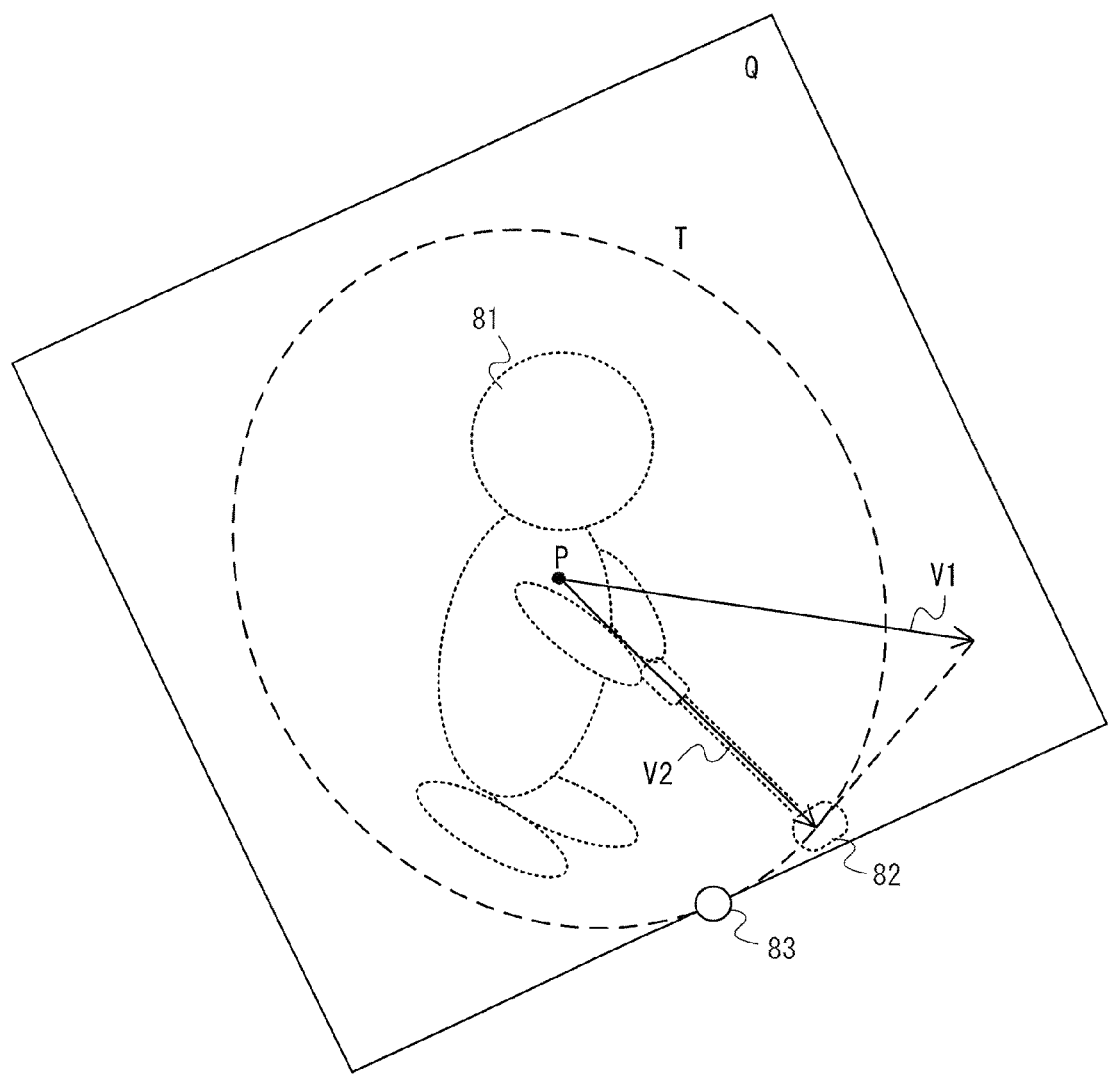
FIG. 18 is a diagram showing an example of a player character, etc., placed in a game space.

FIG. 18 is a diagram showing a player character, etc., placed within the game space. In FIG. 18, the vector V1 shows the attitude calculated in step S11. Specifically, the vector V1 represents the direction of the shaft of the golf club 82 in the attitude calculated in step S11. The vector V2 represents an attitude that has been adjusted in step S3. The point P is the central point of rotation for the rotation of the golf club 82 in a swing operation. The plane Q is a plane (referred to as the "swing plane") on which the golf club 82 rotates. That is, the golf club 82 rotates on the swing plane.

When the attitude of the golf club 82 is adjusted, the CPU 10 first sets the central point P of rotation of the golf club 82. The position of the central point P is determined based on the position and the direction of the player character 81 and the type (club number) of the golf club 82. The position and the direction of the player character and the type of the golf club 82 may be controllable by the player using the controller 5 or may be determined automatically by the game device 3. In other embodiments, the position of the central point P may be fixedly determined relative to the position of the ball. Once the central point P is determined as described above, the CPU 10 sets the swing plane Q. The swing plane Q is set so as to include the central point P and the position of the ball. The swing plane Q is set so as to be parallel to a predetermined reference direction. The reference direction is a direction of reference in which the player character 81 hits the ball, and is the direction in which the ball flies when the face of the golf club 82 squarely strikes the ball. The reference direction may be determined based on the direction of the player character 81, for example.

Then, the CPU 10 calculates the vector V2 obtained by projecting the vector V1 onto the swing plane Q. The vector V2 can be obtained by removing, from the vector V1, a component orthogonal to the swing plane Q. Then, the CPU 10 adjusts the attitude of the golf club 82 so that it is in the direction of the vector V2. Specifically, the CPU 10 calculates a rotation matrix for rotating the vector V1 to the direction of the vector V2, and rotates the attitude of the golf club 82 with the rotation matrix. For example, where the attitude of the golf club 82 is expressed in a matrix, the adjusted attitude can be calculated by multiplying the matrix representing the attitude by the rotation matrix.

As a specific process of step S12, the CPU 10 reads out data representing the attitude of the golf club 82 from the main memory, and calculates the vector V2 from the vector V1, which is determined by the attitude, to calculate the rotation matrix. Then, the adjusted attitude is calculated by rotating the attitude of the golf club 82 with the calculated rotation matrix. Data representing the calculated adjusted attitude is stored in the main memory. The process of step S13 is performed, following step S12.

In step S13, the CPU 10 calculates the position of the golf club 82 based on the attitude of the golf club 82 adjusted in step S12. The position of the golf club 82 is determined to be a position which is on the swing plane Q, and is at a predetermined distance from the central point P, with the shaft of the golf club 82 facing toward the central point P (i.e., the central point P is located along the extension of the shaft). Thus, the position of the golf club 82 is uniquely determined from the attitude of the golf club 82 calculated in step S12. By determining its position as described above, the golf club 82 swings around on the swing plane Q using the central point P as the axis, when the player performs a swing operation. The distance described above is such that the path of the head as the golf club 82 swings around, passes through the position of the ball. The CPU 10 reads out data representing the adjusted attitude calculated in step S12 from the main memory, and calculates the position of the golf club 82 based on the attitude. Then, data representing the adjusted attitude of the golf club 82 calculated in step S12 and the position of the golf club 82 calculated in step S13 is stored in the main memory as the club data 100. The process of step S14 is performed, following step S13.

With the adjustment process of step S12, the attitude of the golf club 82 is adjusted to an attitude parallel to the swing plane Q, and the position of the golf club 82 is set to a position on the swing plane Q by the process of step S13. Therefore, the golf club 82 swings around on the swing plane Q in response to a swing operation by the player, and the head of the golf club 82 as it swings around always strikes the ball. Thus, with the present embodiment, no whiff occurs when a swing operation is performed, and it is possible to make the swing operation easier and to provide a golf game which is easy to operate. In other embodiments, the CPU 10 may not perform the adjustment process of step S12. By providing an upper limit to the angle which determines the adjustment in the adjustment process, the CPU 10 may determine a swing to be a whiff if the unadjusted swing path of the golf club 82 is too far away from the ball. With these features, it is possible to increase the difficulty level of the swing operation.

In step S14, the CPU 10 calculates and stores the velocity of the golf club 82. In the present embodiment, the CPU 10 calculates, as the velocity, the rotational velocity of the golf club 82. Specifically, the CPU 10 calculates the difference between the attitude of the golf club 82 calculated in step S13 in a current iteration of the process loop through steps S2 to S8, and the attitude of the golf club 82 calculated in step S13 in a previous iteration of the process loop through steps S2 to S8 (i.e., the rotational velocity of the golf club 82). In other embodiments, the difference between head positions of the golf club 82 may be calculated as the velocity of the golf club 82. The velocity data representing the calculated velocity of the golf club 82 is stored in the main memory. A predetermined number of latest sets of velocity data (i.e., the velocity data over the last few frames) are stored in the main memory. The process of step S15 is performed, following step S14.

In step S15, the CPU 10 determines whether or not the golf club 82 has contacted the ball. That is, the CPU 10 reads out the club data 100 and the ball data 101 from the main memory, and makes the determination based on the position of the golf club 82 and the position of the ball. If the determination result of step S15 is affirmative, the process of step S16 is performed. On the other hand, if the determination result of step S15 is negative, the process of step S18 to be described below is performed, skipping the processes of steps S16 and S17.

In the determination of step S15, contact between the golf club 82 and the ball can be included, at least, as a condition. In other embodiments, additional conditions may include (a) a predetermined button of the controller 5 be pressed, (b) the velocity of the golf club 82 at contact be greater than or equal to a predetermined velocity, (c) the length of the swing (the length of the backswing) of the golf club 82 be greater than or equal to a predetermined distance, etc. With the provision of these additional conditions, it is possible to prevent the ball from traveling by the processes of steps S16 to S18 to be described below when, for example, the player inadvertently brings the head into contact with the ball when the player directs the controller 5 toward the terminal device 7 in order to check the direction of the head of the golf club 82.

In step S16, the CPU 10 calculates the moving velocity of the ball based on the golf club 82. Specifically, the CPU 10 first calculates, as the velocity of the golf club 82 based on which the moving velocity of the ball is determined, the average velocity of the golf club 82 over the last few frames. That is, the CPU 10 reads out the predetermined number of sets of velocity data from the main memory, and calculates the average velocity among the velocities represented by the sets of velocity data. Then, the CPU 10 determines the velocity of the ball based on the calculated average velocity. For example, the CPU 10 calculates the velocity of the ball as a value obtained by multiplying the average velocity by a predetermined constant. In other embodiments, the moving velocity of the ball may be calculated based on the length of the backswing, etc., in addition to the velocity of the golf club 82. Data representing the calculated velocity of the ball is stored in the main memory. The process of step S17 is performed, following step S16.

In step S17, the CPU 10 calculates the moving direction of the ball based on the attitude of the golf club 82. That is, the CPU 10 reads out the club data 100, and calculates the moving direction of the ball as the direction perpendicular to the face plane of the golf club 82 at the present point in time, i.e., at the point in time when the ball is struck. Data representing the calculated moving direction of the ball is stored in the main memory Since the attitude of the golf club 82 is controlled in step S11 so that the tip direction (Z-axis positive direction) of the controller 5 corresponds to the direction of the shaft of the golf club 82, the direction of the face plane in the present embodiment changes based on the attitude of the controller 5 for the rotation about the Z axis. That is, the player can change the direction of the face plane by rotating (twisting) the controller 5 about the Z axis. In other embodiments, the CPU 10 may calculate the moving direction of the ball based on the path of the golf club 82 (the path of the head), which is calculated from the attitude of the golf club 82 before the adjustment in step S12, in addition to (or instead of) the direction of the face plane. The process of step S18 is performed, following step S17.

The processes of steps S16 and S17 described above determine the launch velocity and the launch direction of the ball when the player character 81 hits the ball. In the present embodiment, the moving velocity of the ball is determined based on the velocity of the golf club 82 (i.e., the velocity at which the controller 5 is swung) at the point of hitting the ball with the golf club 82. The moving direction (the launch direction) of the ball is determined based on the direction of the face plane of the golf club 82 (i.e., the attitude of the controller 5 for the rotation about the Z axis) at the point of hitting the ball with the golf club 82. Therefore, the player can control the launch velocity and the launch direction of the ball by performing the swing operation using the controller 5, as if the player was swinging an actual golf club. That is, with the present embodiment, it is possible to provide a more realistic swing operation.

As described above, the moving direction of the ball is determined based on the attitude of the controller 5 for the rotation about the roll direction (the attitude for the rotation about the Z axis) when the controller 5 is directed toward the terminal device 7. In the present embodiment, the marker coordinate data 94 is used for the calculation of the attitude of the controller 5, which makes it possible to accurately calculate the attitude for the roll direction. Therefore, the player can accurately control the moving direction of the ball based on the attitude of the controller 5 for the roll direction, making the swing operation more realistic.

With the processes of steps S15 to S17, the travel of the ball is initiated (steps S16 and S17) when the golf club 82 and the ball collide with each other (Yes in step S15). That is, in the present embodiment, it is determined that the golf club 82 and the ball have contacted each other when the tip direction of the controller 5 is directed toward the ball image 83 displayed on the terminal device 7, and the ball travels as a result of this determination. Accordingly, it is possible for the player to perform the game operation with the sense of actually hitting the ball with the controller 5, since the player can hit the ball by directing the tip direction of the controller 5 toward the ball image 83. Therefore, in the present embodiment, it is possible to provide a more realistic game operation.

In step S18, the CPU 10 controls the travel of the ball. Herein, the ball is controlled to be stationary, before the ball is hit (before the golf club 82 and the ball come into contact with each other). When the ball is hit (when the golf club 82 and the ball come into contact with each other), the behavior of the ball (the path and the velocity with which the ball travels) is determined based on the moving velocity and the moving direction. While any method may be used for calculating the behavior of the ball, the CPU 10 calculates the behavior while considering, for example, the influences of gravity, air resistance, the rebound off the terrain, etc. Moreover, after the ball is hit, the CPU 10 moves the ball in accordance with the calculated behavior. That is, the position of the ball obtained by moving the ball from the current position by one frame's worth of distance in accordance with the calculated behavior. Specifically, the CPU 10 reads out the ball data 101 from the main memory, and calculates the position of the ball after being moved based on the calculated behavior. Data representing the calculated position of the ball is stored in the main memory as new ball data 101. As described above, after the ball is hit, the position of the ball is updated every frame by the process of step S18, thereby representing the traveling ball. The process of step S19 is performed, following step S18.

In step S19, the CPU 10 controls the position and the attitude of the virtual camera based on the position of the ball. In the present embodiment, the virtual camera is set so that the ball is included in the viewing field range. Specifically, when the ball is stationary, the virtual camera is fixed so that the player character 81, the golf club 82 and the ball are included in the viewing field range (see FIG. 11). While the ball is traveling, the virtual camera is controlled so as to move in accordance with the ball movement so that the ball is included in the viewing field range. Data representing the position and the attitude of the virtual camera, which is set as described above, is stored in the main memory as the camera data 102.

In the process of step S19, the virtual camera can be set so that at least the moved ball is included in the viewing field range. For example, before the ball travels, the virtual camera may be set in such an attitude that it is directed in the reference direction from the position of the player character 81 so as to generate a so-called "first-person perspective" game image.

In the process of step S19, the specific method for controlling the virtual camera may be any method, and the virtual camera may be, for example, arranged near the player character or arranged at a predetermined distance from the ball. The position of the virtual camera may be changed appropriately in accordance with the position of the ball during its travel. Moving the virtual camera rapidly in accordance with movement of the ball when the ball is traveling fast, results in a game image that is not easy to view, and in order to prevent this, the rate of change of the movement and the zoom of the virtual camera may be limited to a predetermined value or less. Also, the ball may be hidden behind another object while traveling, so that the ball is no longer seen from the position of the virtual camera. In such a case, there may be periods of time in which the ball is temporarily not displayed while traveling. That is, although the virtual camera is set so as to follow the travel of the ball, the ball may not always be displayed over the entire period of ball travel. After step S19 described above, the CPU 10 ends the game control process.

With the game control processes described above, the attitude of the golf club 82 is controlled based on the attitude of the controller 5, and the golf club 82 acts in response to a swing operation using the controller 5. Once the ball is hit by the golf club 82, the traveling ball is displayed on the television 2. Processes to be described below can be similar to those of a conventional golf game, and will not be described in detail, but of the game control processes described above, in addition to the processes of steps S10 to S19, processes specific to a golf game will be performed appropriately. For example, before the player performs the swing operation, there may be a process of changing the position and the direction of the player character 81 based on the player operation, and a process of changing the type of golf club based on the player operation. With these operations, the player can freely determine the general direction in which the ball is to be hit (the reference direction described above) and the type of golf club. During the swing operation, the process of making the player character 81 perform a swing action in accordance with the action of the golf club 82 is performed. In addition to the above, in the game control processes, the process of changing the position of the player character to allow for another swing operation once the traveling ball stops, etc., are performed as necessary, thereby allowing the golf game to progress.

Referring back to FIG. 14, the process of step S4 is performed following the game control process of step S3. In step S4, the CPU 10 and the GPU 11b generate a television game image. That is, the CPU 10 and the GPU 11*b* read out the camera data 102 from the main memory to generate an image of the game space as seen from the virtual camera (an image of the game space as seen in the attitude of the virtual camera from the position of the virtual camera) as the television game image. In the present embodiment, before the player character 81 hits the ball, a television game image including the player character 81, the golf club 82 and the ball as seen from behind the player character 81 is generated (see FIG. 11). While the ball is traveling, a television game image including the ball is generated. The generated television game image is stored in the VRAM 11*d*. The process of step S5 is performed, following step S4.

In step S5, the CPU 10 and the GPU 11*b* generate a terminal game image. In the present embodiment, the terminal game image is generated using image data, which is provided in advance. The image data is stored in the optical disc 4 together with the game program 90 and is loaded to the main memory at an appropriate point in time. In the present embodiment, by arranging (rendering) the ball image 83 and the head image 84 on the ground image 85, the terminal game image is generated as shown in FIG. 11. In other embodiments, the terminal game image may be an image that, at least, includes the ball image 83. The terminal game image is an image, which includes either one of the head image 84 and the ground image 85, in addition to the ball image 83.

For the ground image 85, image data representing a plurality of types of grounds such as the fairway, the rough, the bunker and the green are stored in the main memory, and in the terminal game image, a type of image data that corresponds to the type of ground where the ball is placed is used. Different types of image data may be provided for different states of the ball (the lies, e.g., the degree by which the ball is buried in the sand of a bunker or the grass of a rough). In the present embodiment, since the ground image 85 is included in the terminal game image, the player can easily check the state of the ball in the game space, and it is possible to make the terminal game image more realistic.

The ball image 83 is rendered over the ground image 85. The ball image 83 may be displayed in actual size on the LCD 51 to enhance the reality. The display position of the ball image 83 on the screen may be fixed to a predetermined position. With the ball image 83 displayed on the terminal device 7, the player can perform a swing operation with the sense as if the player was actually hitting the ball with the controller 5.

The head image 84 is rendered over the ground image 85 at a position in the game space based on the attitude of the golf club 82. Specifically, the position of the head image 84 is determined so that the positional relationship between the head image 84 and the ball image 83 in the terminal game image coincides with the positional relationship between the head of the golf club 82 and the ball in the game space. The "positional relationship between the head of the golf club 82 and the ball in the game space" is the positional relationship as the game space is viewed from above. As described above, the head image 84 is displayed when the tip direction (Z-axis positive direction) of the controller 5 lies within a predetermined range including such a direction that the tip direction extends toward the terminal device 7, but the head image 84 is not displayed when tip direction is out of the predetermined range. Accordingly, since the head image 84 is displayed when the tip direction of the controller 5 extends toward the terminal device 7, the player feels as if the controller 5 was a part of the golf club, and it is possible to enhance the reality of the swing operation.

In other embodiments, where the process of adjusting the attitude of the golf club 82 (step S12) is not performed, the CPU 10 may calculate the position pointed by the tip direction of the controller 5 based on the attitude of the controller 5, and place the head image 84 at the calculated position. The "position pointed by the tip direction of the controller 5" is a position on the screen of the LCD 51 of the terminal device 7, and ideally, is the position of intersection between the tip direction of the controller 5 (a straight line obtained by extending the Z axis in the positive direction) and the screen. However, in practice, the game device 3 does not need to strictly calculate the position of the intersection, but may calculate a position in the vicinity of the intersection instead.

The direction of the head image 84 on the screen is determined based on the attitude of the golf club 82 for the rotation about its shaft as the axis, i.e., the attitude of the controller 5 for the rotation about the Z axis. Then, the head image 84 can be displayed in a more realistic manner in accordance with the movement of the controller 5, making it possible to further enhance the reality of the swing operation. While the moving direction of the ball changes based on the direction of the head (step S17) in the present embodiment, the player can check the direction of the head by looking at the head image 84, thus improving the controllability of the swing operation.

As described above, the position and the direction of the head image 84 are determined so that the positional relationship between the head image 84 and the ball image 83 on the screen of the terminal device 7 coincides with the positional relationship between the head of the golf club 82 and the ball in the game space. For example, in a state where the tip direction of the controller 5 points at the position on the right side of the ball image 83, the head image 84 is displayed on the right side of the ball image 83 (see FIG. 12). If the position pointed by the controller 5 is moved to the right from the above state, the head image 84 moves to the right (see the dotted line shown in FIG. 12), and if the attitude of the controller 5 is changed from this state so as to rotate about an axis along the tip direction, the direction of the head image 84 changes (see the one-dot-chain line shown in FIG. 12).

A terminal game image including the ball image 83 and the head image 84 placed on the ground image 85 is generated by the process of step S5, and the terminal game image is similar to an image of a ball placed at the foot of the player as actually seen by the player. Thus, it is possible to make the swing operation even more realistic.

In the present embodiment, the game device 3 generates a second image by a method using image data provided in advance, instead of a method of setting a virtual camera in the game space. In a case in which a terminal game image is generated using a virtual camera, generating a realistic and detailed image means constructing models (objects) of terrains, etc., within the game space in detail. However, constructing details models of terrains, etc., increases the amount of model data, and increases the processing load for the conversion process, etc., for generating an image of the game space as seen from the virtual camera. Moreover, although very detailed models are unnecessary for generating the television game image since a large area of the game space is displayed in the television game image than in the terminal game image, constructing detailed models for generating the terminal game image adds to the processing load for the process of generating the television game image.

In contrast, with a method using image data provided in advance as in the present embodiment, the conversion process is not needed, thereby decreasing the processing load for the image generation process. Since the terminal game image is not generated using terrain models, it is possible to generate a detailed and realistic image without constructing terrain models themselves in detail. Since terrain models themselves are not constructed in detail, it is possible to decrease the amount of model data, and to decrease the processing load for the process of generating the television game image. As described above, with the process of generating the terminal game image in the present embodiment (step S5), it is possible to generate a more realistic game image with a simple process.

In other embodiments, the game device may generate a terminal game image by a method using a virtual camera in step S5. That is, with a virtual camera placed above the ball in the game space facing downward, a terminal game image may be generated as an image of the game space as seen from the position of the virtual camera in the attitude of the virtual camera. The game device 3 may generate a portion of the terminal game image using the virtual camera. For example, the game device 3 may generate a ball image and a club image by a method using a virtual camera, and generate the ground image by a method similar to that of the embodiment above.

In step S6 following step S5, the CPU 10 outputs the television game image generated in step S4 to the television 2. Specifically, the CPU 10 sends the image data of the television game image stored in the VRAM 11d to the AV-IC 15, and the AV-IC 15 outputs the image data to the television 2 via the AV connector 16. Thus, the television game image is displayed on the television 2. In a case in which a game sound is generated in the game process, the game sound may be outputted to the television 2, as is the television game image, to be outputted from the speaker 2a. The process of step S7 is performed, following step S6.

In step S7, the CPU 10 outputs the terminal game image generated in step S5 to the terminal device 7. Specifically, the image data of the terminal game image stored in the VRAM 11d is sent by the CPU 10 to the codec LSI 27, and is subjected to a predetermined compression process by the codec LSI 27, after which it is transmitted by the terminal communication module 28 to the terminal device 7 via the antenna 29. The terminal device 7 receives, by means of the wireless module 70, the image data transmitted from the game device 3, and performs a predetermined extraction process using the codec LSI 66. The extracted image data is outputted to the LCD 51. Thus, the terminal game image is displayed on the LCD 51. In a case in which a game sound is generated in the game process, the game sound may be outputted to the terminal device 7, as is the terminal game image, and subjected to an extraction process by the codec LSI 66, after which it is outputted from the speaker 67. The process of step S8 is performed, following step S7.

In step S8, the CPU 10 determines whether the game should be ended. The determination of step S8 is made based on, for example, whether the player has holed out, whether the game is over, or whether the player has given an instruction to quit the game, etc. If the determination result of step S8 is negative, the process of step S2 is performed again. If the determination result of step S8 is affirmative, the CPU 10 ends the game process shown in FIG. 14. Thereafter, the series of processes through steps S2 to S8 is repeatedly performed until it is determined in step S8 that the game should be ended.

As described above, with the embodiment above, an image of the game space around the ball as seen from above is displayed on the terminal device 7 (step S7), and an image of the game space including the player character and the ball as seen from behind is displayed on the television 2 (step S6). The player can swing the golf club 82 in the game space by performing a swing operation using the controller 5 (step S3).

Therefore, in a case in which the terminal device 7 is placed on the floor surface, the ball image 83 is displayed at a position where a ball would be placed in actual golf, and therefore the player can perform the swing operation with the sense as if the player was actually hitting the ball. Thus, with the embodiment above, it is possible to provide a golf game that is more realistic as compared with a case where a game image is simply displayed on the television 2.

In the embodiment above, for the purpose of making the swing operation more realistic, a part of the game space around the ball is displayed on the terminal device 7, and this makes it difficult with the terminal device 7 to display the ball after it is moved by the swing operation in an easily viewable manner. In contrast, with the embodiment above, the ball after being moved is displayed on the television 2, and it is therefore possible to reliably present, to the player, the ball after being moved.

With the embodiment above, the head image 84 is displayed on the terminal device 7 when a predetermined axis of the controller 5 extends toward the terminal device 7. Therefore, by looking at the terminal device 7, the player can perform a more realistic operation, with the sense as if the golf club 82 was moving in connection with the movement of the controller 5.

In the embodiment above, since the game device 3 calculates the attitude of the controller 5 based on captured image data of a captured image (specifically, the marker coordinate data 94) (steps S25 and S26), it is possible to accurately calculate the attitude of the controller 5. Moreover, the game device 3 calculates the attitude of the controller 5 so that the tip direction of the controller 5 lies within a predetermined range including such a direction that the tip direction extends toward the terminal device 7 while the image-capturing device (the image capturing element 40) of the controller 5 is capturing an image of an image-capturing object (the marker section 55). That is, with the embodiment above, it is possible to accurately determine whether the tip direction of the controller 5 extends toward the terminal device 7.

Consider a case where the attitude of the controller 5 is calculated using the acceleration data 92 and the angular velocity data 93, instead of using the marker coordinate data 94. In such a case, the game device 3 cannot determine the positional relationship between the terminal device 7 and the controller 5, and therefore cannot accurately determine whether the tip direction of the controller 5 extends toward the terminal device 7. While the embodiment above assumes that the player stands at a position on the lower side of the screen of the terminal device 7 (see FIG. 11), the player may not actually play the game standing at such a position. Therefore, with the assumption above, if the player is not standing at the position, the golf club 82 may strike the ball in a state where the tip direction of the controller 5 is not toward the ball image 83 displayed on the LCD 51, and the player may feel awkward in the game operation. In contrast, in the embodiment above, since the attitude of the controller 5 is calculated using the marker coordinate data 94, the game device 3 can accurately determine whether the tip direction of the controller 5 extends toward the terminal device 7, no matter where the player is. That is, it is possible to ensure that the golf club 82 strikes the ball in a state where the tip direction of the controller 5 extends toward the ball image 83 displayed on the LCD 51, and it is possible to prevent the player from feeling awkward as described above. In other embodiments, the game device 3 may calculate the attitude of the terminal device 7 without using the marker coordinate data 94.

[7. Variations]

The embodiment above is merely an example, and the game system may be implemented with a configuration to be described below, for example, in other embodiments.

(Variation in which Movement of Terminal Device is Reflected in Game Process)

In the embodiment above, terminal operation data obtained in the terminal device 7 is not used in game processes, and the movement, the attitude and the position of the terminal device 7 are not reflected in the game processes. In other embodiments, the game device 3 may use the terminal operation data in the game processes, and reflect the movement of the terminal device 7, etc., in the game processes. For example, the game device 3 may calculate the attitude of the terminal device 7 based on the azimuthal direction data of the magnetic sensor 62, the acceleration data of the acceleration sensor 63 and the angular velocity data of the gyrosensor 64, and determine the predetermined reference direction based on the attitude of the terminal device 7 for the rotation about an axis orthogonal to the screen of the LCD 51. Then, the player can change the reference direction by changing the direction of the terminal device 7.

(Variation Using Marker Device 6)

In the embodiment above, in order to obtain marker coordinate data for calculating the attitude of the controller 5, the marker section 55 of the terminal device 7 is used, but the marker device 6 is not used. In other embodiments, the game system 1 may light the marker device 6 (the marker device 6 may emit light) together with (or instead of) the marker section 55. In a case in which the marker section 55 and the marker device 6 are both lit, the processes of steps S25 and S26 are performed both in a state where the controller 5 is capturing an image of the marker section 55 and where the controller 5 is capturing an image of the marker device 6 in the embodiment above. Therefore, the game device 3 can more accurately calculate the attitude of the controller 5.

In a case in which the marker section 55 and the marker device 6 are both lit, the game device 3 may fail to accurately calculate the attitude of the controller 5 because it is not possible to distinguish whether the controller 5 is capturing an image of the marker section 55 or the marker device 6, thereby incorrectly detecting one for the other. Therefore, the game system 1 may prevent erroneous detection by the following method, for example.

For example, the game device 3 may perform a control such that while one of the marker section 55 and the marker device 6 is lit, the other is not lit during a game. The game device 3 may determine, based on the attitude of the controller 5, whether the controller 5 is capturing an image of the marker section 55 or the marker device 6 (i.e., whether the tip direction of the controller 5 extends toward the marker device 6 or toward the marker section 55). The attitude of the controller 5 used in this determination can be calculated based on the detection result of, for example, the acceleration sensor 37 or the gyrosensor 48. For example, in the embodiment above, it can be determined that the controller 5 is directed toward the marker section 55 when the tip direction of the controller 5 is roughly pointing down, and it can be determined that the controller 5 is directed toward the marker device 6 when the tip direction of the controller 5 is roughly horizontal. In other embodiments, the marker section 55 and the marker device 6 may be differentiated from each other in terms of the shape and/or number of markers so that the game device 3 can distinguish them from each other.

(Variation Regarding Game Operation Using Controller 5)

In the embodiment above, the controller 5 transmits the acceleration data, the angular velocity data and the marker coordinate data to the game device 3 as the movement data based on the movement of the controller device, and the game device 3 calculates the attitude of the controller device based on the movement data and moves objects of the game (the golf club 82 and the ball) based on the calculated attitude. In other embodiments, the controller 5 may transmit data other than those listed above as the movement data. For example, the controller 5 may include a magnetic sensor, and transmit azimuthal direction data detected by the magnetic sensor to the game device 3.

The game device 3 may calculate information, other than the attitude of the controller 5, as long as it represents the movement of the controller 5, and may calculate the position, the acceleration, etc., of the controller 5, for example. The specific method for controlling objects based on the movement of the controller 5 may be any method as long as objects are moved based on the movement of the controller 5. For example, in a golf game such as that of the embodiment above, the game device 3 may detect a swing motion of the controller 5 (the act of swinging the controller 5) based on acceleration data, etc., and move the golf club 82 in response to the detection of the swing motion.

(Variation Regarding Objects Set in Game Space)

In the embodiment above, the object of the golf club 82 is set in the game space, in addition to the ball object, which is the object to be moved. The action of the golf club 82 is controlled based on the operation data 91 of the controller 5, and the movement of the ball is controlled based on the action of the golf club 82. In other embodiments, at least, only the object to be moved in the game space (the ball object in the embodiment above) needs to be set, but the golf club object does not have to be set. Where the golf club object is not set, the movement of the ball may be controlled based on operations on the controller 5 (the operation data 91). For example, the CPU 10 may detect the act of swinging the controller 5 to move the ball in a predetermined direction with a predetermined velocity in response to the detection of the action. For example, the CPU 10 may calculate the moving direction and the moving velocity of the ball based on the attitude of the controller 5. Where the golf club object is not set, a game image not including the image of the golf club may be generated as the television game image, e.g., a game image representing the game space in front of the player character from a first-person perspective. In that case, the terminal game image may or may not include the head image. Where the terminal game image includes the head image, the position and the direction of the head image may be calculated based on the attitude of the controller 5. Specifically, the head image may be placed at a position pointed by the Z-axis direction of the controller 5 and in a direction in accordance with the rotation thereof about the Z axis.

(Other Game Examples)

Although the present embodiment is directed to a case where the game device 3 performs a golf game, the game to be played on the game system 1 may be any game. For example, games involving an object to be controlled by the controller 5 (e.g., a club) and an object to be hit and moved by that object (e.g., a ball) include gate ball and billiards. The game system 1 is applicable to these games. For example, in a gate ball game, the terminal device 7 is placed on the floor surface as in the embodiment above with an image of a ball displayed on the screen of the LCD 51. The player can hit the ball with a stick in the game space by swinging the controller 5 as if it was a stick. In a billiard game, the terminal device 7 is placed so that the screen is parallel to the vertical direction with an image of a ball displayed on the screen of the LCD 51. The player can shoot a ball with a cue in the game space by moving the controller 5 as if to strike the image of the ball displayed on the screen with the controller 5. As described above, in the game system of the present embodiment, while the terminal device 7 is a portable display device, its placement can be freely changed depending on the contents of the game, making the present game system suitable for a variety of games.

(Variation Regarding Device for Performing Game Processes)

While, in the embodiment above, the series of game processes shown in FIG. 14 is performed by the game device 3, some of the game processes may be performed by other devices. For example, in other embodiments, some of the game processes (e.g., the process of generating the terminal game image) may be performed by the terminal device 7. In other embodiments, in a game system that includes a plurality of information processing devices that can communicate with each other, the game processes may be divided among the plurality of information processing devices.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable to a game system, a game device, a game program, or the like, for a game in which game operations are performed by moving a controller device, with the aim of, for example, providing a more realistic game.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising a game device, a controller device, and a portable display device,
the controller device configured to:
output attitude data based on an attitude of the controller device; and
transmit operation data including the attitude data to the game device;
the game device configured to:
receive the operation data from the controller device;
perform a game control process based on the operation data to generate a first game image and a second game image based on a result of performing the game control process;
output the first game image to a predetermined display device separate from the portable display device; and
output the second game image to the portable display device;
the portable display device configured to:
receive the second game image from the game device; and
display the second game image; and
the game device further configured to:
calculate an attitude of the controller device based on the operation data;
move a first object placed in a virtual game space based on the attitude of the controller device;
generate the first game image by setting a first virtual camera so that the first object is included in a viewing field range; and
generate a second game image including an image representing at least a part of the first object when a predetermined axis of the controller device lies within a predetermined range including such a direction that the predetermined axis extends toward the portable display device.

2. The game system according to claim 1, wherein the game device further configured to:
generate a second game image including an image representing a second object placed in the game space; and
move the second object on at least a condition that the first object and the second object have come into contact with each other.

3. The game system according to claim 2, wherein the first object is controlled so that the first object contacts the second object in the game space when a predetermined axis of the controller device is directed toward an image representing the second object displayed on the portable display device.

4. The game system according to claim 2, wherein a moving velocity of the second object is calculated based on a velocity of the controller device when the first object and the second object come into contact with each other.

5. The game system according to claim 2, wherein a moving direction of the second object is calculated based on an attitude of the controller device for rotation about a predetermined axis when the first object and the second object come into contact with each other.

6. The game system according to claim 1, wherein
the controller device further configured to output attitude data including captured image data of a captured image captured by an image-capturing device provided in the controller device; and
the game device further configured to calculate the attitude of the controller device based on a position, in the captured image, of a predetermined image-capturing object provided on the portable display device, and control the first object based on the attitude of the controller device.

7. The game system according to claim 6, wherein the attitude of the controller device is calculated based on the captured image data so that a predetermined axis of the controller device lies within a predetermined range including such a direction that the predetermined axis extends toward the portable display device when the image-capturing device is capturing an image of the image-capturing object.

8. The game system according to claim 7, wherein
the controller device is further configured to include a sensor whose detection result varies based on the attitude of the controller device, and output attitude data which further includes output data of the sensor; and
the game device further configured to calculate the attitude of the controller device based on the output data of the sensor, and adjust the calculated attitude based on the captured image data when the image-capturing device is capturing an image of the image-capturing object.

9. The game system according to claim 8, wherein
the controller device configured to include an acceleration sensor and a gyrosensor as the sensor;
the attitude data includes acceleration data detected by the acceleration sensor and angular velocity data detected by the gyrosensor; and
the game device configured to adjust, using the acceleration data and the captured image data, the attitude of the controller device calculated based on the angular velocity data.

10. The game system according to claim 1, wherein a second virtual camera is placed in the game space to generate, as the second game image, an image representing the game space as seen from the second virtual camera.

11. The game system according to claim 1, wherein the second game image is generated using image data representing an object stored in a memory accessible from the game device.

12. The game system according to claim 11, wherein the second game image is generated so that an image representing at least a part of the first object is displayed at a position based on the attitude of the controller device.

13. The game system according to claim 11, wherein the second game image is generated that an image representing at least a part of the first object is displayed in a direction based on the attitude of the controller device for rotation about the predetermined axis.

14. A game system comprising a game device, a controller device, and a portable display device, the game system configured to:
obtain operation data including attitude data based on an attitude of the controller device;
calculate the attitude of the controller device based on the operation data;
move a predetermined object placed in a virtual game space based on the attitude of the controller device;
generate, as a game image to be displayed on a predetermined display device separate from the portable display device, the first game image by setting a first virtual camera so that the predetermined object is included in a viewing field range; and
generate, as a game image to be displayed on the portable display device, a second game image including an image representing at least a part of the first object when a predetermined axis of the controller device lies within a predetermined range including such a direction that the predetermined axis extends toward the portable display device.

15. A game system comprising a game device, a controller device, and a portable display device, the game system configured to:
calculate an attitude of the controller device, and control an attitude of a club in a virtual game space based on the attitude of the controller device;
display an image of the game space including the club on a predetermined display device separate from the portable display device; and
display an image representing a ball placed in the game space on the portable display device, and display, on the portable display device, an image representing a tip of the club, together with the image representing the ball, when a predetermined axis of the controller device extends toward the portable display device.

16. A game device configured to communicate with a controller device and a portable display device, comprising:
a processing system having at least one processor, the processing system configured to:
receive, from the controller device, operation data including attitude data based on an attitude of the controller device;
perform a game control process based on the operation data to generate a first game image and a second game image based on a result of performing the game control process;
output the first game image to a predetermined display device separate from the portable display device;
output the second game image to the portable display device so as to display the second game image on the portable display device;
calculate the attitude of the controller device based on the operation data;
move a first object placed in a virtual game space based on the attitude of the controller device;
generate the first game image by setting a first virtual camera so that the first object is included in a viewing field range; and
generate a second game image including an image representing at least a part of the first object when a predetermined axis of the controller device lies within a predetermined range including such a direction that the predetermined axis extends toward the portable display device.

17. A non-transitory computer-readable storage medium storing a game program to be executed by a computer of a game device which is configured to communicate with a controller device and a portable display device, the game program instructing the computer to provide execution comprising:
obtaining operation data including attitude data based on an attitude of the controller device from the controller device;
performing a game control process based on the operation data to generate a first game image and a second game image based on a result of performing the game control process;
outputting the first game image to a predetermined display device separate from the portable display device;
outputting the second game image to the portable display device so as to display the second game image on the portable display device;
calculating the attitude of the controller device based on the operation data;

moving a first object placed in a virtual game space based on the attitude of the controller device;

generating the first game image by setting a first virtual camera so that the first object is included in a viewing field range; and generating a second game image including an image representing at least a part of the first object when a predetermined axis of the controller device lies within a predetermined range including such a direction that the predetermined axis extends toward the portable display device.

18. A game process method to be executed in a game system comprising a game device, a controller device, and a portable display device, the controller device configured to:
output attitude data based on an attitude of the controller device; and
transmit operation data including the attitude data to the game device;

the game device configured to:
receive the operation data from the controller device;
perform a game control process based on the operation data to generate a first game image and a second game image based on a result of performing the game control process;
output the first game image to a predetermined display device separate from the portable display device; and
output the second game image to the portable display device;

the portable display device configured to:
receive the second game image from the game device; and
display the second game image;

the game device further configured to:
calculate the attitude of the controller device based on the operation data;
move a first object placed in a virtual game space based on the attitude of the controller device;
generate the first game image by setting a first virtual camera so that the first object is included in a viewing field range; and
generate a second game image including an image representing at least a part of the first object when a predetermined axis of the controller device lies within a predetermined range including such a direction that the predetermined axis extends toward the portable display device.

19. The game system according to claim 1, wherein the part of the first object is generated in the second game image when an orientation of the controller device is determined as being pointed in a direction within a range of the portable display device.

20. The game system according to claim 19, wherein the part of the first object is omitted in the second game image when the orientation of the controller device is determined as being pointed in a direction outside of the range of the portable display device.

* * * * *